US007004497B2

(12) United States Patent
Thomas et al.

(10) Patent No.: US 7,004,497 B2
(45) Date of Patent: Feb. 28, 2006

(54) STYLING FLEXIBLE DRIVER AIR BAG MODULE AND METHOD OF MAKING SAME

(75) Inventors: Scott David Thomas, Novi, MI (US);
Robert E. Bowser, Brighton, MI (US);
Peggy M. Gossiaux, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 116 days.

(21) Appl. No.: 10/337,933

(22) Filed: Jan. 7, 2003

(65) Prior Publication Data

US 2004/0130131 A1 Jul. 8, 2004

(51) Int. Cl.
*B60R 21/16* (2006.01)
*B60R 21/20* (2006.01)

(52) U.S. Cl. .................................. 280/728.3; 280/731
(58) Field of Classification Search ................ 280/731, 280/728.3, 743.1
See application file for complete search history.

(56) References Cited

U.S. PATENT DOCUMENTS

| | | | | |
|---|---|---|---|---|
| 5,531,476 A | * | 7/1996 | Kerner | 280/743.1 |
| 5,580,082 A | * | 12/1996 | Shiga et al. | 280/728.3 |
| 5,647,610 A | | 7/1997 | Nagata | 280/731 |
| 5,765,865 A | | 6/1998 | Nagata et al. | 280/731 |
| 5,931,492 A | * | 8/1999 | Mueller et al. | 280/728.2 |
| 6,070,904 A | * | 6/2000 | Ozaki et al. | 280/743.1 |
| 6,105,999 A | * | 8/2000 | Johnson | 280/727 |
| 6,126,193 A | * | 10/2000 | Hosoi et al. | 280/731 |
| 6,142,510 A | * | 11/2000 | Endo et al. | 280/731 |
| 6,164,687 A | * | 12/2000 | Yamamoto et al. | 280/728.3 |
| 6,168,189 B1 | * | 1/2001 | Dennis | 280/728.3 |
| 6,206,409 B1 | * | 3/2001 | Kato et al. | 280/728.2 |
| 6,260,876 B1 | * | 7/2001 | Froude et al. | 280/728.3 |
| 6,283,502 B1 | * | 9/2001 | Endo et al. | 280/731 |
| 6,349,599 B1 | | 2/2002 | Lynnworth et al. | 73/644 |
| 6,364,344 B1 | | 4/2002 | Hudd et al. | 280/728.2 |
| 6,412,812 B1 | * | 7/2002 | Ford | 280/731 |
| 6,464,248 B1 | * | 10/2002 | Derrick | 280/728.3 |
| 6,481,745 B1 | * | 11/2002 | Ford | 280/731 |
| 6,568,702 B1 | * | 5/2003 | Ford | 280/728.2 |
| 6,585,288 B1 | * | 7/2003 | Nishiura et al. | 280/728.3 |
| 6,585,292 B1 | * | 7/2003 | Abe et al. | 280/743.1 |
| 6,592,142 B1 | * | 7/2003 | Landen et al. | 280/728.2 |
| 6,669,228 B1 | * | 12/2003 | Shah et al. | 280/728.3 |
| 6,672,614 B1 | * | 1/2004 | Endo et al. | 280/731 |
| 6,695,343 B1 | * | 2/2004 | Christiansen et al. | 280/731 |

OTHER PUBLICATIONS

U.S. Appl. No. 10/080,345 filed Feb. 21, 2002, published Aug. 22, 2002.
BREED Technologies, Inc. Opel Epsilon Driver Airbag Product Description, pp. 2.4-1 to 2.4-2.

* cited by examiner

*Primary Examiner*—Eric Culbreth
(74) *Attorney, Agent, or Firm*—Laura C. Hargitt

(57) ABSTRACT

A common air bag module for the different spoke patterns of a vehicle steering wheel. The cover is configured with a cavity to fit over multiple steering wheel configurations. The common air bag module has common internals including a common cushion pack with chamfered corners on one side and a rounded side opposite the side with the chamfered corners and a common tear seam approach to enable styling flexibility with a plurality of cover show surface options.

24 Claims, 15 Drawing Sheets

STYLING FLEXIBLE DRIVER AIR BAG MODULE AND METHOD OF MAKING SAME

TECHNICAL FIELD

This invention relates to the commonality of air bag modules and their internals for use in combination with differently shaped and styled air bag covers on vehicle steering wheel and different steering wheel spoke orientations.

BACKGROUND OF THE INVENTION

There are three basic driver air bag cover shapes that are used in vehicles: a round shape, a rectangular shape, and a triangular shape. The shape, in large measure, is influenced by the spoke location on the steering wheel.

Currently driver air bag internals are designed for each cover shape in which they are placed. For instance, the cushion pack and the module base plate are the shape of the outer cover. This makes it impossible to use radically different cover shapes with common air bag internals.

There have been attempts to provide one or more secondary escape paths in the cover to allow the cushion to deploy laterally. This approach complicates using different cover shapes with common module internals because the secondary cover tear seams and compatible cushion pack folds place additional constraints on the design. As vehicle development times are shortened, more styling freedom is needed.

SUMMARY OF THE INVENTION

This invention uses common air bag internals (cushion pack brick, module base plate, cover attachment), common tear seams on the cover, a common steering wheel attachment interface, and, potentially, a common horn mechanism.

Around these internals a round cover shape, rectangular cover shape, triangular cover shape, or any combination of these may be placed. An upper secondary escape path in the cover may also be used allowing the cushion to deploy laterally away from the occupant into an open space between steering wheel spokes. Lower secondary escape paths may or may not be used.

The use of common air bag internals provides numerous technical advantages. Deployment performance may be decoupled from the styled cover shape and the steering wheel spoke pattern. This enables inexpensive and quick cover and steering wheel appearance changes for new programs. Different cover shapes and steering wheel spoke patterns can be easily and quickly implemented on a common vehicle architecture without an extensive development program for air bag performance. Styling freedom is greatly increased. Common module internals will allow the original equipment manufacturer (OEM) and the supply community to focus on and optimize over time one design instead of multiple designs.

Driver air bag modules are becoming smaller than the steering column that is forward of them. For this reason, utilizing cover sizes that are slightly larger than that achieved by form-fitting the cushion pack to fit the cover outer shape may not be appropriate.

Accordingly, an air bag module is provided with a common base plate shape (i.e., having a cross-sectional periphery that is within+/−20% from a predetermined periphery), a common cushion pack volume (i.e., a packed volume that is within+/−20% of a predetermined volume), a common cover attachment approach, and a common cover tear seam approach so that the module fits within a plurality of different steering wheel covers. The covers may have an approximate round outer perimeter shape, an approximate rectangular outer perimeter shape, an approximate triangular outer perimeter shape, or any combinations of these shapes. Such commonality permits each supplier, who accepts the concept, to develop its own common design using its own cushion attachments, inflator attachments, horn mechanism, etc.

Within this commonality concept the driver air bag module may have or permit:
 a. a common cushion fold approach,
 b. a common steering wheel interface,
 c. a common threaded fastener or snap-in interface to the steering wheel,
 d. a common horn interface,
 e. a common membrane horn in the driver air bag module,
 f. a common floating horn mountable to the driver air bag module, or to the steering wheel, or partially mountable to the steering wheel and the driver air bag module,
 g. a common cover tear seam, and
 h. a common secondary escape path in the cover:

Also within the commonality concept the module cover's appearance surface or face or configuration may have or permit:
 a. the surface to be recessed between 0 and 100 m below or behind the rearward appearance surface of the steering wheel rim, preferably recessed 10 mm.
 b. a common recess amount,
 c. a common inflator interface,
 d. a common inflator body and interface,
 e. a common baseplate assembly,
 f. a cushion pack perimeter that consists of an approximately square cross-sectional shape or configuration with the lower corners chamfered and the upper edge partially rounded, or
 g. a cushion pack perimeter that consists of an approximate square cross-sectional shape with the lower corners chamfered and the upper edge rounded,
 h. an "I" Tear Seam On Cover Face, i.e. a cover tear seam that consists of a vertical tear seam on the cover face, an upper tear seam running approximately between the cover face and the upper cover side where the vertical tear seam terminates, and a lower tear seam which follows the inner cover housing walls. Upon deployment, the cover opens into a left flap and a right flap,
 i. an "I" Tear Seam On Cover Face with Secondary Upper Escape Path Flap, i.e. a cover tear seam that consists of a vertical tear seam on the cover face, an upper tear seam running approximately between the cover face and the upper cover side where the vertical tear seam terminates, and a lower tear seam which follows the inner cover housing walls, and left and right secondary tear seams which are also included and which run from the upper tear seam along the upper cover surface toward the module base plate, and which upon deployment, permits the cover to open into a left flap, a right flap, and an upper flap,
 j. an "I" Tear Seam On Cover Face and Upper Surface, i.e. a cover tear seam that consists of a vertical tear seam on the cover face that continues around the upper cover surface to a location near the edge of the upper cover, and a lower tear seam located on the cover face where the vertical tear seam terminates, and wherein the lower tear seam follows the inner cover housing lower and chamfered walls, and wherein the edge of the upper cover is not attached to the air bag module base plate, so that, upon deployment, the cover opens into a left flap and a right flap, k. an "I" Tear Seam On Cover Face and Upper Surface with Weak Upper Cover Attachment, i.e. a cover tear seam that consists of a vertical tear seam on the cover face that continues around the upper cover surface to the edge of the upper cover, a lower tear seam located on the cover face where the vertical tear seam terminates, and wherein the lower tear seam follows the inner cover housing lower horizontal and chamfered walls, the edge of the upper cover is weakly attached to the air bag module base plate, and upon deployment, the cover opens into a left flap and a right flap and the weak attachment between the upper cover and the air bag module base plate separates (in the "I" tear seam embodiments of the air bag modules of h, i., J, and k the vertical tear seam may also be routed around the side of an attached emblem or may also be routed through the attached emblem), l. an Inverted "T" Tear Seam On Cover Face, i.e. a cover tear seam that consists of a vertical tear seam on the cover face that initiates near the center of the cover face and continues upward and terminates at an upper tear seam running approximately between the cover face and the upper cover side, and wherein two tear seams that initiate at the bottom of the vertical tear seam route outward to the inner cover housing walls and terminate at two primarily angled tear seams in or near the chamfered area of the internal housing walls, and wherein the angled tear seams may extend partially along the adjacent horizontal internal cover housing walls, so that, upon deployment, the cover opens into a left flap, a right flap, and a lower flap, m. an Inverted "T" Tear Seam With Secondary Upper Escape Path Flap, i.e. a cover tear seam that consists of a vertical tear seam on the cover face that initiates near the center of the cover face and continues upward and terminates at an upper tear seam running approximately between the cover face and the upper cover side, and wherein two tear seams that initiate at the bottom of the vertical tear seam route outward to the inner cover housing walls and terminate at two primarily angled tear seams near the chamfered area of the internal cover housing walls, and wherein the angled tear seams may extend partially along the adjacent horizontal internal cover housing walls, and wherein left and right secondary tear seams are also included that run from the upper tear seam along the upper cover surface toward the module base plate, so that, upon deployment, the cover opens into a left flap, a right flap, a lower flap, and an upper flap, n. an Inverted "T" Tear Seam on Cover Face and Upper Surface, i.e. a cover tear seam that consists of a vertical tear seam on the cover face that initiates near the center of the cover face and continues upward around the upper cover surface to a location near the edge of the upper cover, and wherein two tear seams that initiate at the bottom of the vertical tear seam route outward to the inner cover housing walls and terminate at two primarily angled tear seams near the chamfered area of the internal cover housing walls, and wherein the angled tear seams may extend partially along the adjacent horizontal internal cover housing walls, and wherein the edge of the upper cover is not attached to the air bag module base plate, so that upon deployment, the cushion opens into a left flap, a right flap, and a lower flap, o. an Inverted "T" Tear Seam On Cover Face And Upper Surface With Weak Upper Cover Attachment, i.e. a cover tear seam that consists of a vertical tear seam on the cover face that initiates near the center of the cover face and continues upward around the upper cover surface to the edge of the upper cover, and wherein two tear seams that initiate at the bottom of the vertical tear seam route outward to the inner cover housing walls and terminate at two primarily angled tear seams near the chamfered area of the internal cover housing walls, and wherein the angled tear seams may extend partially along the adjacent horizontal of vertical internal cover housing walls, and wherein the edge of the upper cover is weakly attached to the air bag module base plate, so that, upon deployment, the cover opens into a left flap, a right flap, and a lower flap and the weak attachment between the upper cover and the air bag module base plate separates (in the inverted "T" tear seam embodiments of the air bag modules of 1, m, n and 0 the tear seams may also route around the sides of an attached emblem or through the attached emblem), p. an edge of the upper cover to be tucked under the steering wheel shroud for pre-deployment retention, q. an "H" Tear Seam, i.e. with a cover tear seam that consists of a horizontal tear seam on the cover face that continues from a left tear seam to a right tear seam, and wherein the left and right tear seams follow the inner cover housing walls, route around the lower chamfered internal cover housing walls and terminate at the bottom internal cover housing wall, so that upon deployment, the cover opens into an upper flap and a lower flap (in the air bag module of this "H" tear seam embodiment the tear seam may also route around the sides of an attached emblem or through the attached emblem. It may also have left and right tear seams that continue around the upper cover surface and terminate near the module base plate. It may also have left and right tear seams that terminate near the edge where the cover face and the upper cover surface meet. The air bag module of any of these tear seam embodiments may also have a driver air bag cover that partially extends over some of the steering wheel spokes with a portion of this extension including the base cover shape; that partially extends over some of the steering wheel spokes without extending over the base cover shape; and that does not extend over the steering wheel spokes), r. a "T" Tear Seam, i.e. with a cover tear seam that consists of a horizontal tear seam on the cover face that continues from a left tear seam to a right tear seam, and wherein the left and right tear seams follow the inner cover housing walls, angle around the lower chamfered internal cover housing walls and terminate at the bottom internal cover housing wall and with a vertical tear seam on the cover extending downwardly from the horizontal tear seam to the angled lower left and right tear seams, so that upon deployment, the cover opens into an upper flap and two lower flaps extending from the angled tear seams along the chamfered internal cover housing walls. The tear seams may also continue along the upper cover surface.

Also within this commonality concept the module cover's appearance sides may have or permit:

a. one or more lower tear seams on the cover side which allow additional escape flaps of the module to hinge at the cover's base plate:

i. where the cover has internal escape flaps and the lower tear seams route between the flaps, or ii. where the cover has internal escape flaps that join to the outer cover surface and where the lower tear seams route so that the tear seams only go through one thickness of the cover material.

In the air bag modules of these embodiments with "I" and "Inverted T" tear seams, the edge of the upper cover may be tucked under the steering wheel shroud for pre-deployment retention; the tear seams are only located on the outer show or appearance surface layer of the cover; and the cover flap hinges are only located on the outer show or appearance surface layer of the cover.

In the air bag module of this "Inverted T" tear seam embodiment, the tear seams may also be routed around the sides of an attached emblem or through the attached emblem.

Accordingly, a driver air bag module is provided comprising a cushion pack subassembly and a steering wheel cover portion. The cushion pack subassembly has a cushion, an internal attachment ring, an inflator, and an outer attachment ring. The cover portion encloses the cushion pack subassembly. The cushion pack subassembly is configured in elevation as a substantial square with two chamfered corners on one side. The cushion pack subassembly is also configured so that the substantial square has a partially rounded side opposite the side with the chamfered corners.

A driver air bag module may also be provided with any selected one of a plurality of steering wheels having spoke-formed spaces and interchangeable vehicle steering wheel covers having respectively differently configured walls at least one of which is a rounded peripheral wall defining respectively different cavities. The air bag module includes a cushion pack subassembly which has a predetermined common peripheral configuration fittable within each of the different cavities and is differently spatially related to at least one of the walls defining the cavity but contiguous to the rounded peripheral wall in the selected one of the plurality of vehicle steering wheel covers. Expandability of the cushion pack to the rounded wall permits the air bag cushion to have increased volume. One of the walls defining the cavity on the selected one of the plurality of vehicle steering wheel covers may have a cover tear seam common to the tear seams on others of the plurality of vehicle steering wheel covers and which upon deployment permits the air bag to deploy laterally into a spoke-formed space. The air bag module may have a predetermined base plate common to the predetermined peripheral configuration of the cushion pack subassembly. The air bag module may include a predetermined common cushion pack subassembly of predetermined volume common to the predetermined peripheral configurations of the module cavities.

A method of manufacturing a common air bag cushion pack subassembly for use in each of a plurality of interchangeable air bag covers each having a wall including a rounded wall defining respectively differently configured cavities for receiving a cushion pack subassembly comprises configuring a cushion pack subassembly which is sufficiently fittable within each of the differently configured cavities that the subassembly will be receivable therein, and which subassembly has a wall portion which is spaceable differently from the air bag cover walls at respective points along the peripheral wall of the subassembly and contiguous with the rounded wall portion when the subassembly is received in the cavity of the air bag cover; inserting an air bag cushion and an inflator within the subassembly; and attaching a baseplate to the subassembly. The structure which is used for attaching the subassembly to the air bag cover is exposed when the base plate is attached to the subassembly.

The above objects, features, advantages and other objects, features and advantages of the invention are readily apparent from the following detailed description of the best modes for carrying out the invention when taken in connection with the accompanying drawings.

BRIEF DESCRIPTION OF THE DRAWINGS

FIGS. 2E 1–4 show perspective top views of the interchangeable round, rectangular, and triangular steering wheel covers shown in phantom respectively in FIGS. 1C, 1B, and 1D;

FIGS. 3D 1–4 show perspective rear views of the internal cavities of the round (3D-1), rectangular (3D-2), and triangular covers (3D-3 and 4) shown in FIGS. 2E-1, 2E-2 and 2E-3 and 4;

FIGS. 4A-1 and 4A-2 show perspective views (before and after tearing) of a round cover for a two spoke steering wheel having an "I" tear pattern or seam with a separate upper escape path flap;

FIGS. 4B-1 and 4B-2 show perspective views (before and after tearing) of a triangular cover for a three-spoke steering wheel having; an "I" tear pattern or seam with separate upper escape path flap;

FIGS. 4C-1 and 4C-2 show perspective views (before and after tearing) of a rectangular cover for a four-spoke steering wheel having an "I" tear pattern or seam with a separate upper escape path flap;

FIGS. 5A-1 and 5A-2 show perspective views (before and after tearing) of a round cover for a two spoke steering wheel having an "I" tear pattern or seam with upper flap portions attached to main cover flaps;

FIGS. 5B-1 and 5B-2 show perspective views (before and after tearing) of a triangular cover for a three-spoke steering wheel having an "I" tear pattern or seam with upper flap portions attached to main cover flaps;

FIGS. 5C-1 and 5C-2 show perspective views (before and after tearing) of a rectangular cover for a four-spoke steering wheel having an "I" tear pattern or seam with upper flap portions attached to main cover flaps;

FIGS. 8A-1 and 8A-2, 8B-1 and 8B-2, 8C-1 and 8C-2, 8D-1 and 8D-2 and 8E-1 and 8E-2 show fragmentary perspective front views (before and after tearing) of square steering wheel covers with various lower cover tear seam configurations and lower escape path flaps;

FIGS. 9A-1 and 9A-2 show perspective front views (before and after tearing) of a round steering wheel cover for a two-spoke steering wheel having an "H" tear pattern or seam with separate upper and lower escape path flaps;

FIGS. 9B-1 and 9B-2 show perspective front views (before and after tearing) of a triangular steering wheel cover for a three-spoke steering wheel having an "H" tear pattern or seam with separate upper and lower escape path flaps;

FIGS. 9C-1 and 9C-2 show perspective front views (before and after tearing) of a rectangular steering wheel cover for a four-spoke steering wheel having an "H" tear pattern with separate upper and lower escape path flaps;

FIGS. 14A-1 and 14A-2 show perspective front views (before and after tearing) of a round steering wheel cover for a two-spoke steering wheel having an "T" tear pattern or seam with an upper and two lower escape path flaps;

FIGS. 14B-1 and 14B-2 show perspective front views (before and after tearing) of a triangular steering wheel cover for a three-spoke steering wheel having an "T" tear pattern or seam with an upper and two-lower escape path flaps; and FIGS. 14C-1 and 14C-2 show perspective front views (before and after tearing) of a rectangular steering wheel cover for a four-spoke steering wheel having a "T" tear pattern with an upper and two lower escape path flaps.

DESCRIPTION OF THE PREFERRED EMBODIMENTS

Figure 1:
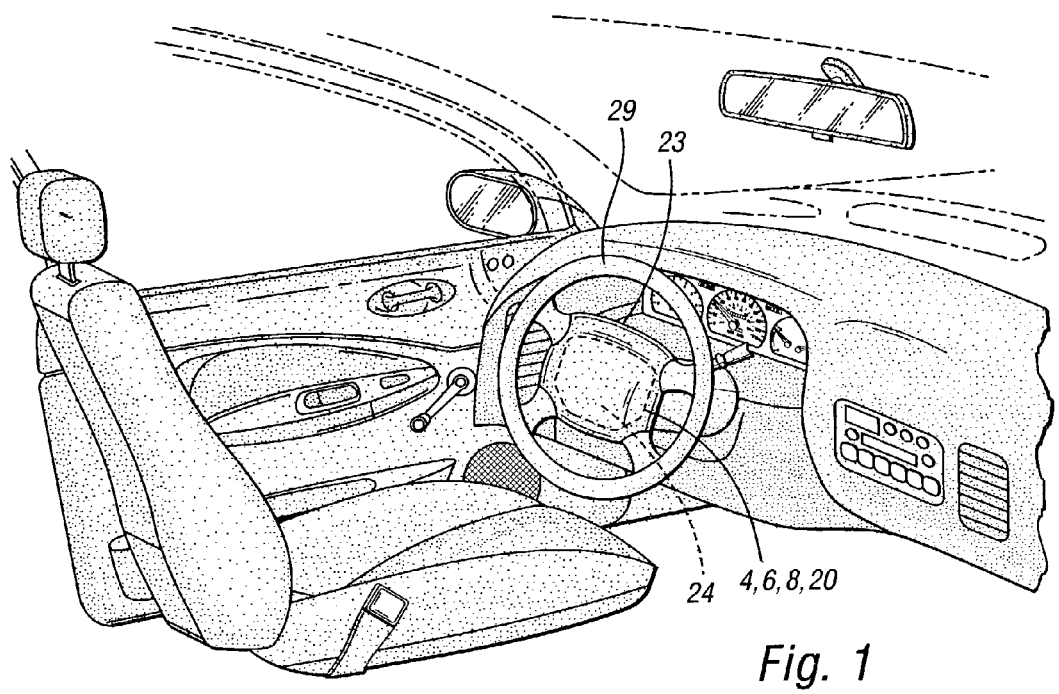
FIG. 1 is a fragmentary perspective view of a vehicle steering wheel and air bag cover in a driver front seat cockpit.
Figure 1A:
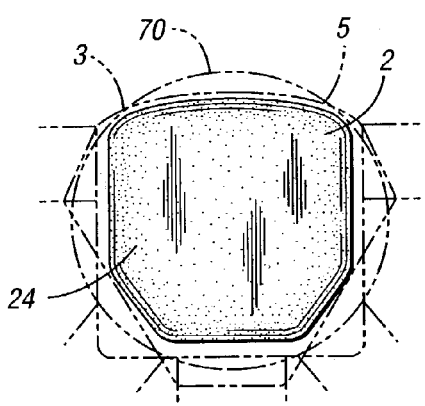
FIG. 1A shows a composite cover overlay of the common cushion pack brick or subassembly of this invention in combination with different spoke style steering wheel cover.
Figure 1B:
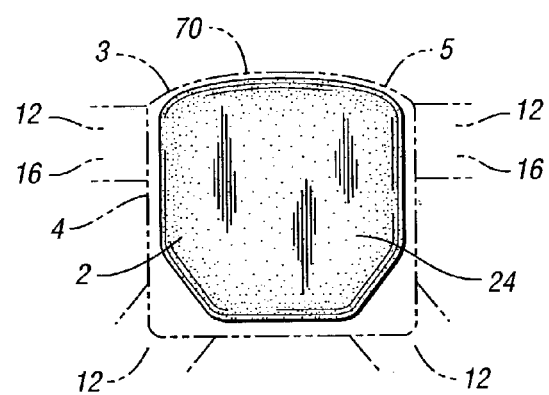
FIG. 1B shows schematically the cushion pack brick or subassembly of FIG. 1A in combination with a rectangular, four-spoke steering wheel cover.
Figure 1C:
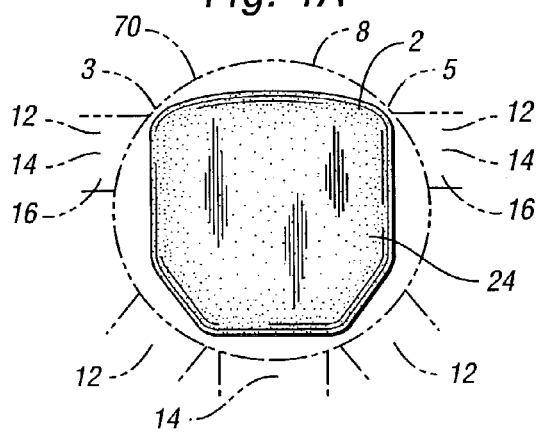
FIG. 1C shows schematically the cushion pack brick or subassembly of FIG. 1A in combination with a round three-spoke and/or four-spoke steering wheel cover.
Figure 1D:
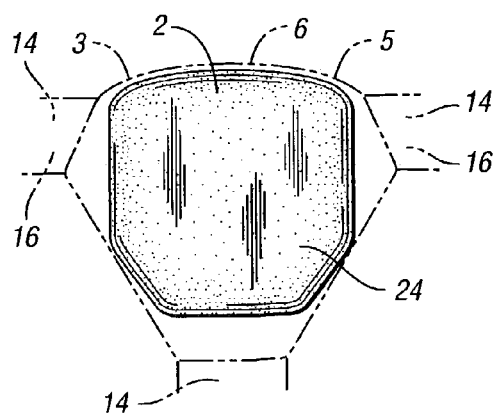
FIG. 1D shows schematically the cushion pack brick or subassembly of FIG. 1A in combination with a triangular, three-spoke steering wheel cover.

The commonality concept of this invention provides common air bag module internals and performance parameters such as tear seams and cushion folds that enable different cover shapes and steering wheel spoke patterns. The technical advantage of this invention is to sufficiently separate driver air bag styling and driver air bag module deployment performance so that expensive and lengthy driver air bag module development is not needed for each individual implementation.

Common Driver Air Bag Module

With reference to FIGS. 1, 2C, 3B, 7, and 7A–B, driver air bag module 23 combines one of several interchangeable steering wheel covers 4, 6, 8 and 20, each having a mainstream common cavity 34 (shown in FIGS. 3B and 7A–B) with a plurality of module internals, primarily a cushion pack subassembly 24 with cushion 36 and an inflator 26. FIGS. 1A–1D show the mainstream common cushion pack configuration 2 that in elevation consists of a rectangular shape with the lower corners chamfered and upper edge slightly rounded. Outer steering wheel covers such as a triangular shape 20, a rectangular shape 4, a modified triangular shape 6, and a round shape 8 may be used interchangeably. For cover shapes 4, 6, 8 and 20 a common cushion pack subassembly 24 has a cross-section or configuration 2 which fits in close proximity to the upper cover surface 70 of the cover at locations 3 and 5. Variants of these basic cover shapes may also be used. Straight walls may be rounded slightly and round walls may be slightly straightened within the purview of this invention.

Likewise, variants of the mainstream common cushion pack configuration 2 may be used. One likely variant, as shown in FIG. 1E would be to use a squared-off common cushion pack configuration 10 with an upper edge 7 that is not rounded. The squared-off common cushion pack configuration 10 is also in close proximity to the upper cover surface 70 at locations 3 and 5.

Another variant, as shown in FIGS. 1F–1I would be to use an alternative common cushion pack configuration 102. For the rectangular cover shape 4, the triangular cover shape 6, and the round cover shape 8, the alternative common cushion pack configuration 102 is in close proximity to the cover upper cover surface 70 at location 103.

As illustrated in FIGS. 1B–1D and 1F–1I, various steering wheel spoke orientations may be used as shown in phantom. Spokes 12 comprise a 4-spoke application, spokes 14 comprise a 3-spoke application, and spokes 16 comprise a 2-spoke application. Various spoke angles and spoke locations are enabled and may be used with each outer cover shape.

Figure 2A:
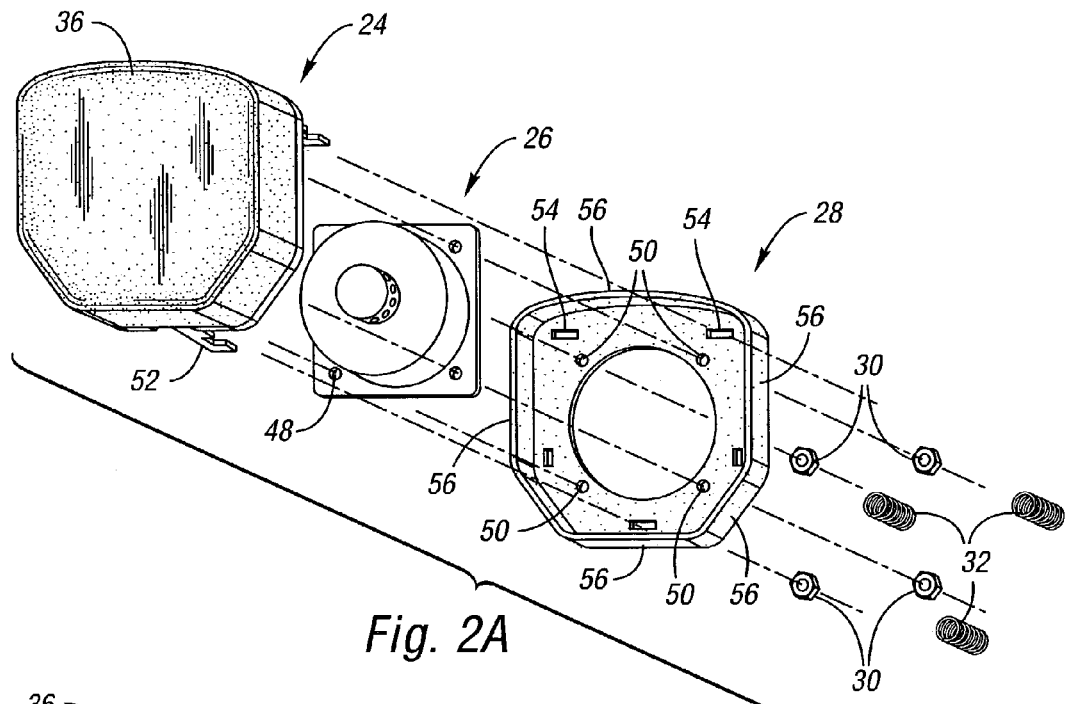
FIG. 2A is an exploded, front, perspective exemplary view of the possible internals of the common cushion pack or subassembly of this invention.
Figure 2B:
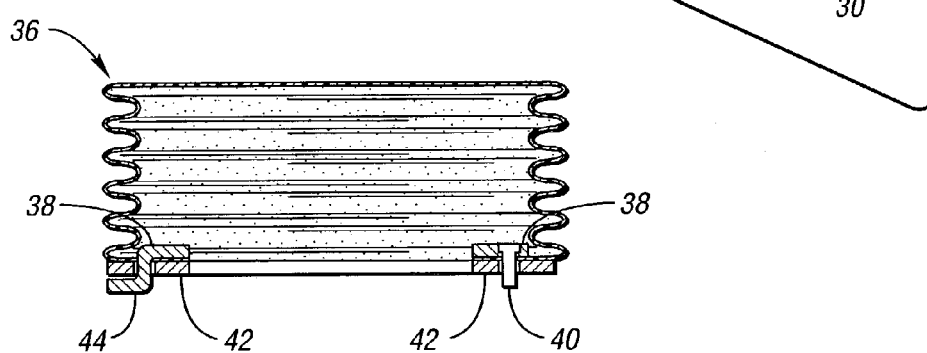
FIG. 2B shows the cross-section of the assembled internals of FIG. 2A.
Figure 2C:
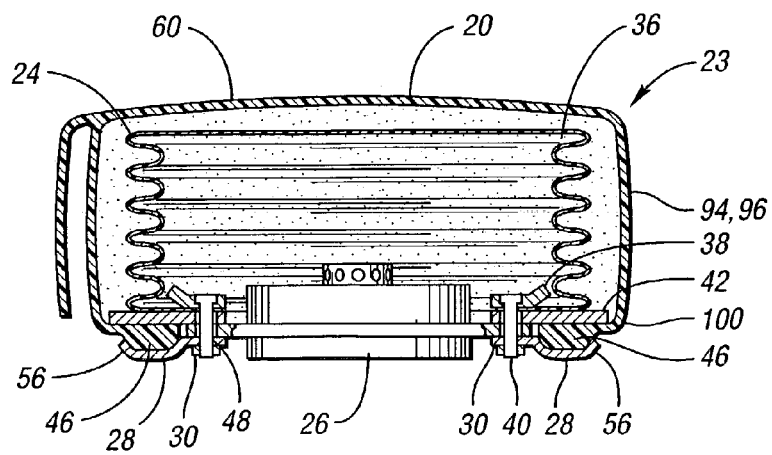
FIG. 2C shows the cross-section of the assembled internals of FIG. 2A in combination with a representative cross-section of a steering wheel cover.
Figure 2D:
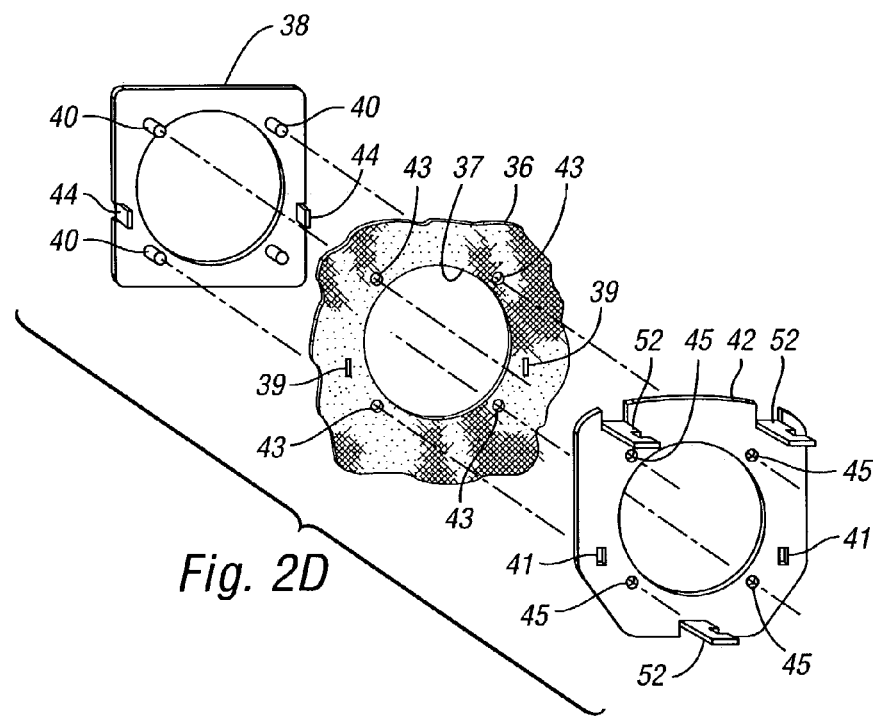
FIG. 2D shows additional parts utilized to assemble the cushion portion of the exploded internals of FIG. 2A.
Figures 1, 2E:
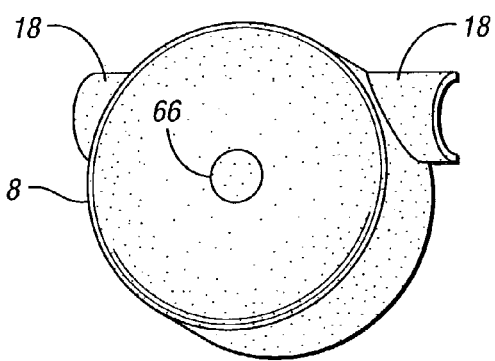
Figures 2, 2E, 3:
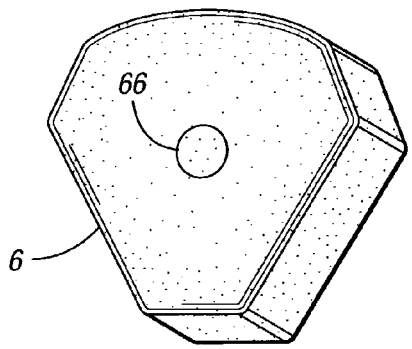
Figures 2, 2E:
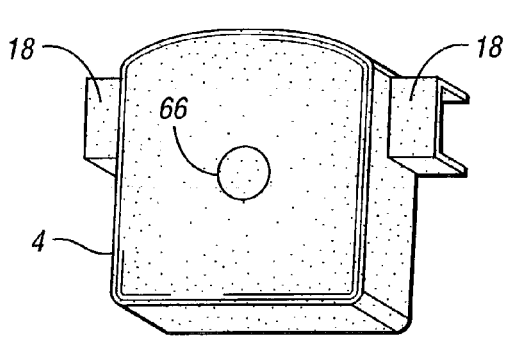
Figures 2, 2E, 3, 4:
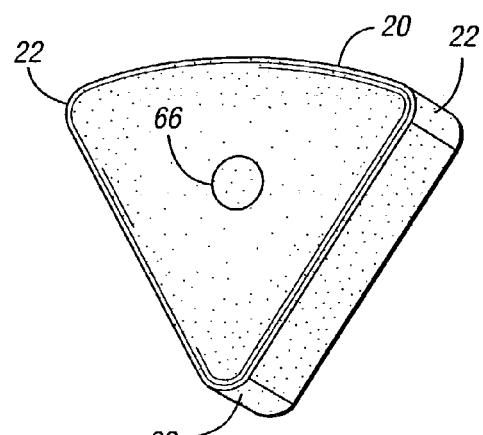
Figure 3A:
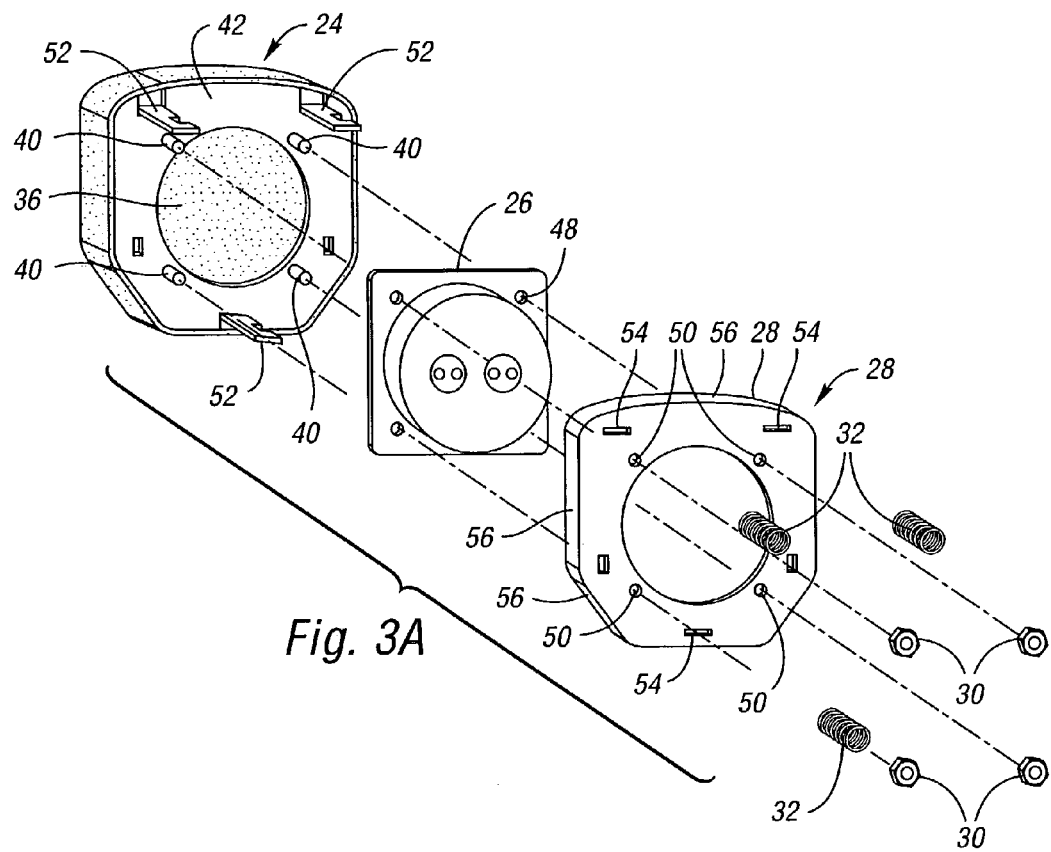
FIG. 3A is an exploded, rear, perspective exemplary view of the possible internals of the common cushion pack subassembly of this invention shown in FIG. 2A.
Figure 7:
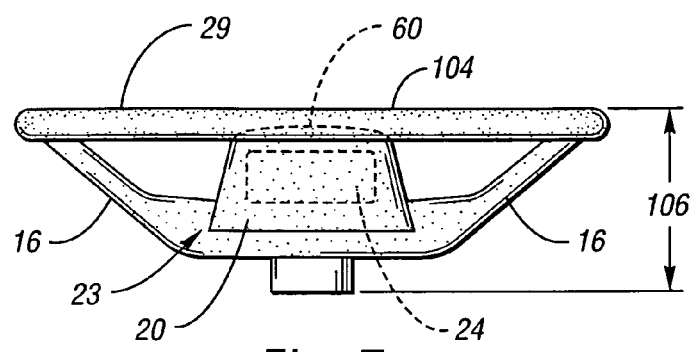
FIG. 7 is a side elevational view of a steering wheel provided with the driver air bag module and common cushion pack brick or subassembly of this invention.
Figure 7A:
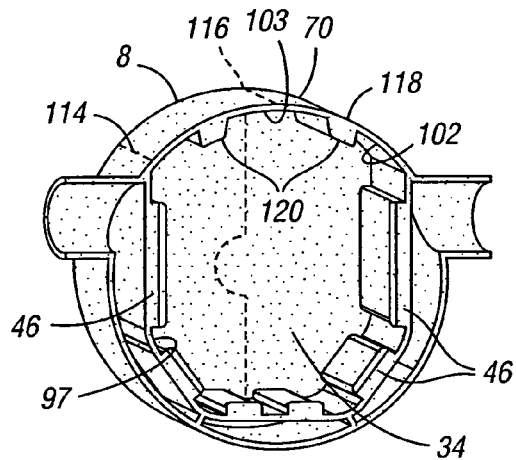
FIG. 7A shows a perspective rear view of a round steering wheel cover cavity with internal flaps and tear seam routes.
Figure 7B:
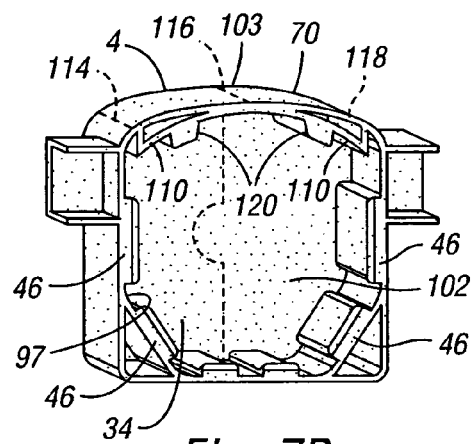
FIG. 7B shows a perspective rear view of a rectangular steering wheel cover cavity with ribs, internal flaps and tear seam routes.
Figure 7C:
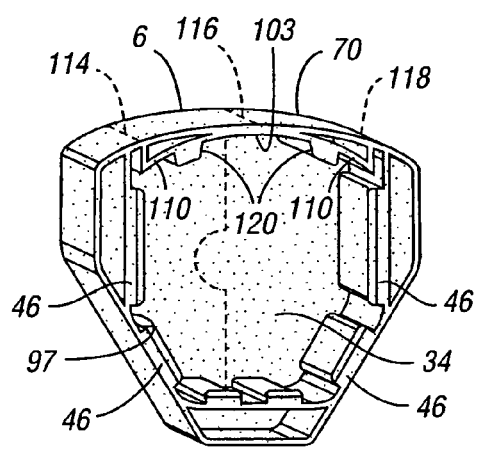
FIG. 7C shows a perspective rear view of a triangular steering wheel cover cavity with ribs, internal flaps and tear seam routes.
Figure 7D:
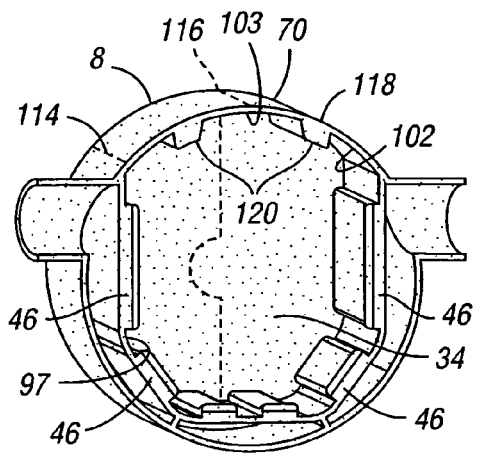
FIG. 7D shows a perspective rear view of a round steering wheel cover cavity with internal flaps, and tear seam routes, and shorter ribs to permit the cushion pack brick of this invention to be in close proximity to the upper cover surface of the round cover cavity.
Figure 7E:
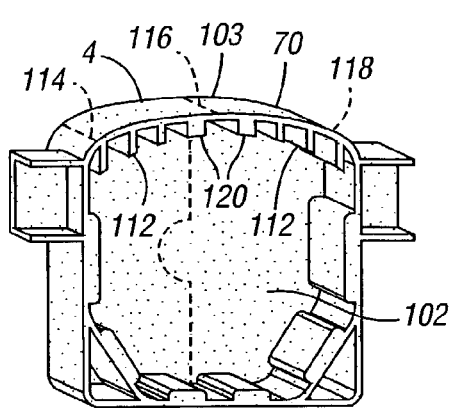
FIG. 7E shows a perspective rear view of a rectangular steering wheel cover cavity with internal flaps, and tear seam routes, and shorter ribs to permit the cushion pack brick of this invention to be in close proximity to the upper cover surface of the square cover cavity.
Figure 7F:
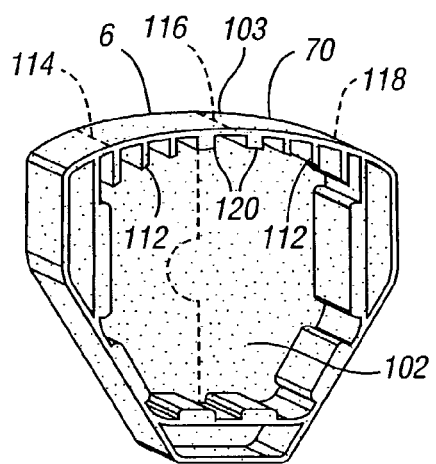
FIG. 7F shows a perspective rear view of a triangular steering wheel cover cavity with internal ribs, and tear seam routes, and shorter ribs to permit the cushion pack brick of this invention to be in close proximity to the upper cover surface of the triangular cover cavity.
Figures 1, 8A:
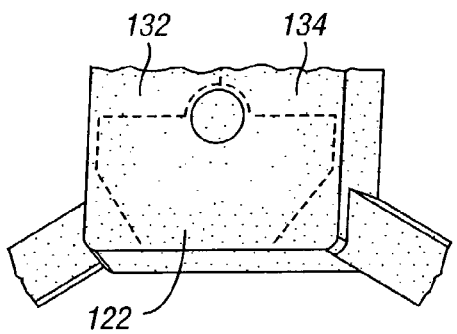
Figures 2, 8A:
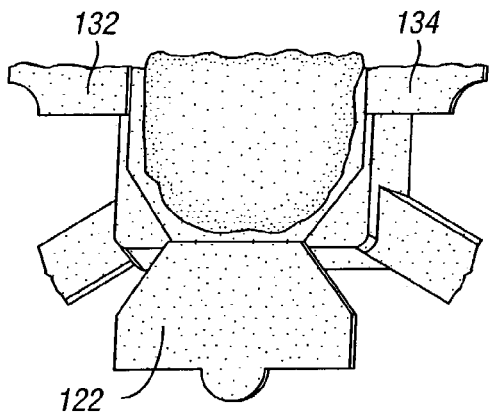
Figures 1, 8B:
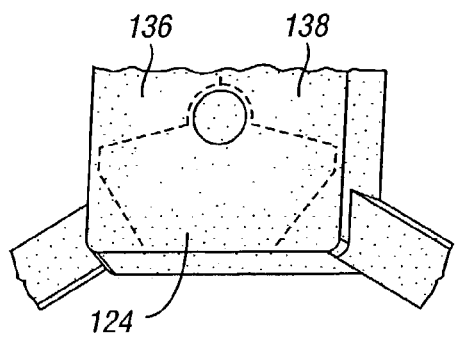
Figures 2, 8B:
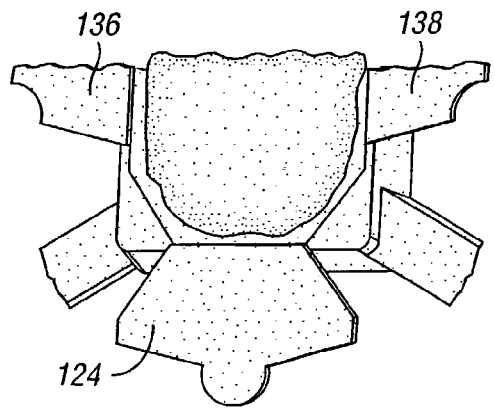
Figures 1, 8C:
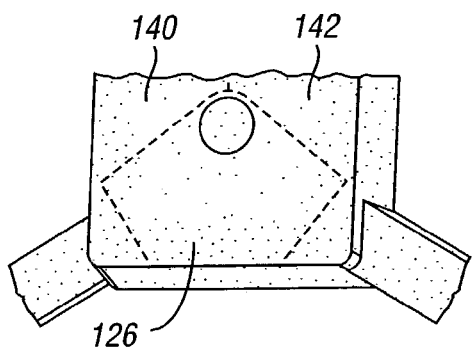
Figures 2, 8C:
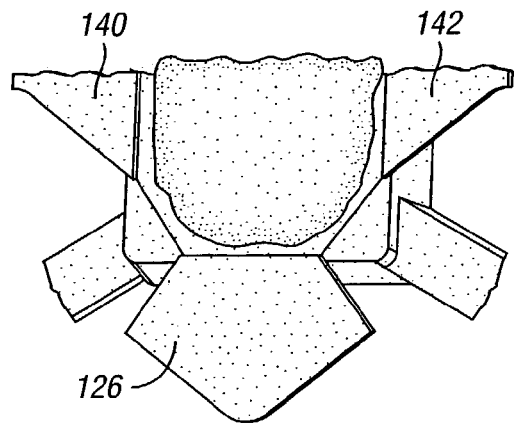
Figures 1, 8D:
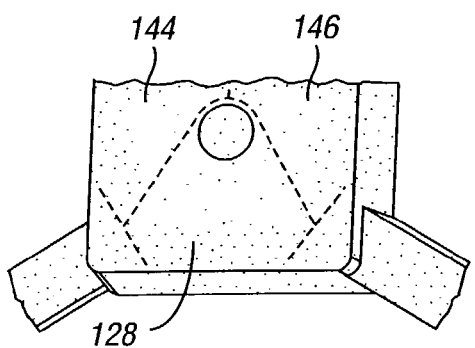
Figures 2, 8D:
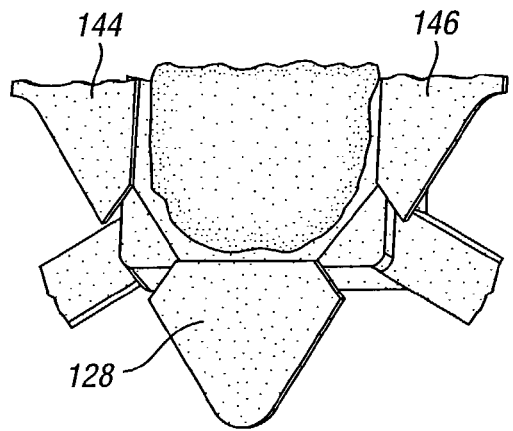
Figures 1, 8E:
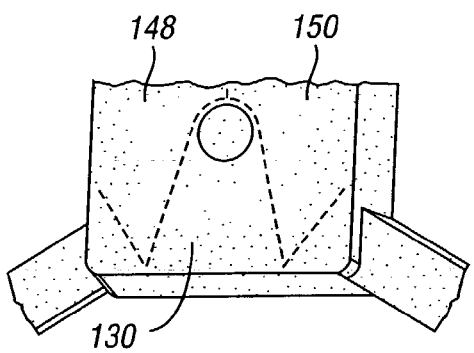
Figures 2, 8E:
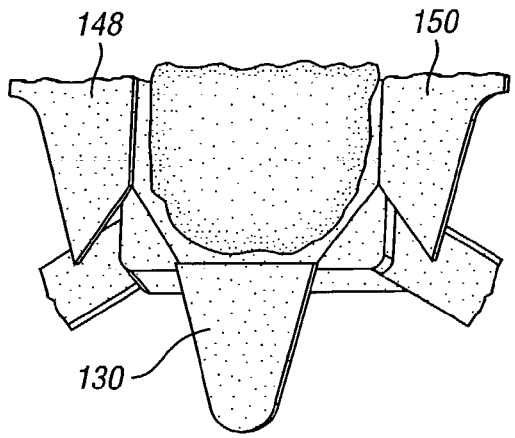

FIGS. 2A and 3A show exploded views (front and rear) of all the module internals including common cushion pack subassembly 24 with the cushion 36 plus other module internals such as inflator 26, baseplate 28, nuts or fasteners 30, and springs 32 for use with the interchangeable covers 4 (square), 6 (modified triangular), 8 (round), and 20 (triangular) in FIGS. 2E-1 through 2E-4 and 3D-1 through 3D-4 of a steering wheel 29 (FIG. 7). FIG. 2B shows a cross-section through the cushion pack subassembly 24 and FIG. 2C shows a cross-section of the driver air bag module 23 through the steering wheel covers 4, 6, 8 or 20 and the module internals, such as cushion pack subassembly or brick 24 and inflator 26.

The steering wheel covers (as illustrated in FIGS. 2E 1–2, 3B–C and 7A, B and D with the rectangular shape 4 and the round shape 8) can optionally have extension(s) 18 that would extend over a portion of the steering wheel spoke(s) such as 16 (FIG. 7). These extensions 18 may be separate from the basic cover shape.

The cover 20 (as illustrated in FIG. 2E-4 for the slightly different triangular shape) may have extension(s) 22 that would extend over a portion of the steering wheel spoke(s). All or a portion of these extensions 22 may be included as part of the basic cover shape.

As can be seen in FIGS. 2A–2D and FIG. 3A, the driver air bag module 23 includes the module internals 24, 28, 30 and 32. These internals have a common interface to the steering wheel. These airbags may be common by supplier or common across suppliers. Each supplier normally has their own design for the air bag module internals. These module internal components need not be 100% common between applications but would be sufficiently common (i.e., module internals having an assembled cross-sectional periphery and an assembled volume that is within+/−20% of a predetermined cross-sectional periphery and a predetermined assembled volume may be employed) so that deployment performance is not affected by the variation. Preferably, the design should accommodate different manufacturer's inflators 26.

FIGS. 7A–7F show alternative internal cover wall configurations 97 for receiving a common cushion pack configuration 102, such as shown in FIGS. 1F–I. The cover internal walls 97 interface differently with respect to the cushion pack configurations 2, 10 and 102 at the upper cover surfaces 70 where the cushion packs 2, 10 and 102 are in close proximity at locations 103 of the steering wheel covers. These cover internals are discussed hereinafter.

Returning to FIGS. 2A–2D and FIG. 3A, each steering wheel cover such as 4, 6, 8, and 20 of FIGS. 2E-1 through 2E-4 has an internal cover cavity 34 (shown, for example, in FIGS. 3B through 3D-4) that is substantially common internally for each cover shape so that a common cushion pack subassembly 24 may be used. The cushion pack subassembly 24 is configured as 2 or 10 in FIGS. 1A to 1E to fit into the common internal cavity 34 or is configured as 102 in FIGS. 1F to 1I to fit into a slightly modified cavity 34. As shown in FIGS. 3B and 3C for covers 9, in some cases it may be necessary to add ribs 11 or 35 to the internal wall 97 to offset or bridge any gap where the cushion pack subassembly 24 interfaces the internal cover wall configurations 97 so that a more common internal cover cavity 34 is present. The bridging ribs 11 or 35 may be added to accommodate the cushion pack subassembly and its peripheral spacing from the cavity walls for any cover shape and in numerous locations beyond those shown in FIGS. 3B and 3C.

Returning to FIGS. 2A–2D and FIG. 3A, a cushion pack subassembly 24 is used that conforms to the common internal cover cavities 34 (FIGS. 3B, C and D) when the cushion 36 is folded and installed into each cover 4, 6, 8, and 20. The cushion 36 of the cushion pack subassembly 24 is a balloon-like air bag with an opening or hole 37 for inflation. The cushion may have different tuning elements from application to application such as different vents, different tether lengths, different cushion diameters, and different cushion materials. These elements would be adjusted to achieve acceptable deployment performance in each individual vehicle application. Preferably, the tuning elements would also be made common. Also, the cushion ideally would have a common fold or a fold that had limited variants that did not affect deployment performance. The likely starting points for folds are: A) a hybrid fan fold with the lower portion of the fold modified to fit in the chamfered lower cushion pack brick. B) a radially deployed fold.

Potential Method of Manufacturing Air Bag Module

Figures 3B, 3C:
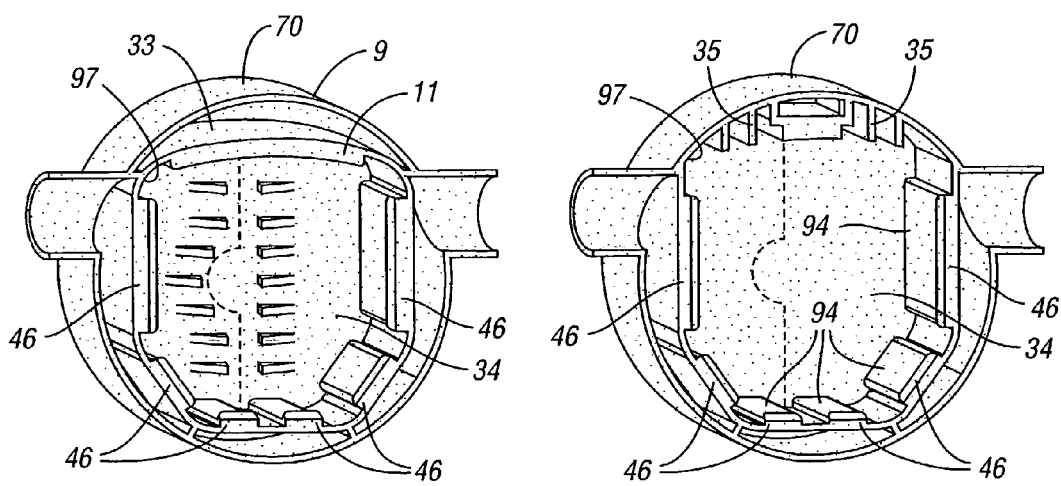
FIG. 3B shows a perspective rear view of a round steering wheel cover with space bridging ribs and two-spoke cover extensions.
FIG. 3C shows a perspective rear view of a round steering wheel cover with other space bridging ribs and two-spoke cover extensions.

As shown in FIGS. 2A, 2D and 3A, the cushion pack subassembly 24 contains the air bag cushion 36, an internal attachment ring 38 with threaded, pressed-in studs 40 and an outer attachment ring 42. The inner attachment ring 38 (FIG. 2D) is passed through hole 37 of the air bag into the cushion 36 and seated in the cushion so that the studs 40 protrude through holes 43 in the cushion 36 to insert or impale the cushion on the attachment ring. Then the outer attachment ring 42 is attached. The studs 40 and the tabs 44 are inserted into the holes 41 in the outer attachment ring 42. The tabs 44 are then bent to hold the cushion pack subassembly 24 together. Each supplier may have a slightly different approach.

The cushion pack subassembly 24 is placed into the common internal cover cavity 34 of each cover 4, 6, 8, 9 and 20. The edge of the outer attachment ring 42 is seated inside the cover tabs 46 (FIG. 2C).

The inflator 26 is inserted over the studs 40. The studs 40 pass through the holes 48 in the inflator 26. The base plate 28 is installed so that the studs 40 pass through the holes 50 in the base plate 28. The snap-in attachment prongs 52 on the outer attachment ring 42 pass through holes 54 in base plate 28 (FIG. 2C). The edges 56 of the base plate 28 capture the bent-over cover tabs 46 between the base plate 28 and the outer attachment ring 42 (FIG. 2B). (These attachments retain the covers 4, 6, 8, and 20 during air bag deployment.) Fasteners 30 are driven onto the studs 40 and springs 32 are installed on the snap-in attachment prongs 52 to complete the assembly of the driver air bag module 23 (FIG. 3A). Each supplier may have a different approach for inflator cushion cover and snap-in prong attachment assembly. These different approaches may all be used within the spirit of this invention since they will not affect the cushion pack volume/shape, cushion fold, tear seam orientation, or other performance parameters that are made common with this concept.

Several different horn approaches may be used with this concept. A membrane horn (not shown) located in the space between the cushion pack subassembly 24 (FIGS. 2B, 2C and 3A) and the face 60 of the air bag cover 4, 6, 8 and 20 may be used (FIG. 2C). A floating horn (not shown) attached to the air bag may be used. A floating horn (not shown) attached to the steering wheel may be used. A floating horn (not shown) attached partially to the air bag and the steering wheel may be used. Each supplier may have a slightly different approach. A common interface between the steering wheel and the driver air bag is desired with the concept of this invention so that different supplier's designs will be interchangeable.

Several driver air bag module-to-steering-wheel attachment approaches may be used. Snap-in attachments may be used. Snap-in attachment prongs 52 and springs 32 reflect the one approach (FIGS. 2A and 2D). The prongs snap into a feature (not shown) in the steering wheel. The prongs may be released from the feature by moving a portion of the feature. Also threaded fasteners (not shown) may be used to attach the driver air bag module 23 to the steering wheel. A common interface between the steering wheel and the driver air bag module is desired with the concept disclosed herein.

Common Air Bag Cover Tear Seam

To keep air bag deployment performance common it is also desirable to have a common tear seam approach. Three possible tear seam approaches are most likely: A) An "I" tear pattern with an optional separate upper escape path flap. B) An "I" tear pattern with upper escape path flaps attached to the main cover flaps. C) An "H" tear pattern. These will now be discussed in detail.

The following three examples which illustrate these tear seam concepts use either mainstream common cushion pack configuration 2, as shown in FIGS. 1A–1D or squared-off common cushion pack cross-section 10, as shown in FIG. 1E. Both of these configurations interface with the upper cover surface 70 at locations 3 and 5.

(As shown in FIGS. 7A–7F, it is also possible to use alternative common cushion pack configurations or cross-sections 102. The cover internal walls interface differently to the upper cover surface 70 in that they are in close proximity to the upper cover surface 70 at location 103. These cover internals are discussed hereinafter.)

"I" Tear Pattern with Optional Separate Upper Escape Path Flap

Figure 1E:
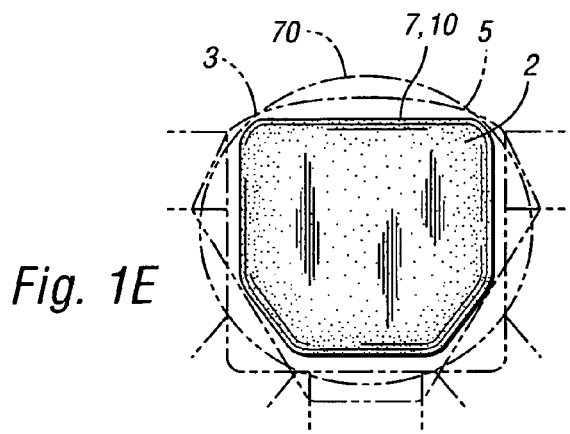
FIG. 1E shows a variation of the cushion pack brick or subassembly of FIG. 1A with a squared-off upper edge.
Figure 1F:
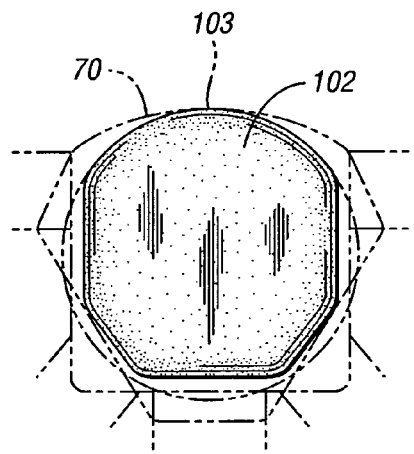
FIG. 1F shows a composite cover overlay of a variation of the common cushion pack brick or subassembly shown in FIG. 1A.
Figure 1G:
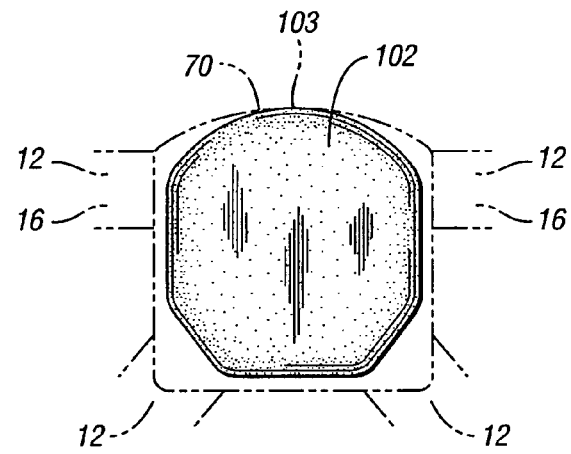
FIGS. 1G, H and I show the variation of the cushion pack brick of FIG. 1A with a curved upper edge in close proximity respectively to the upper edges of the rectangular cover shape (FIG. 1G), round cover shape (FIG. 1H), and triangular cover shape (FIG. 1I)
Figure 1H:
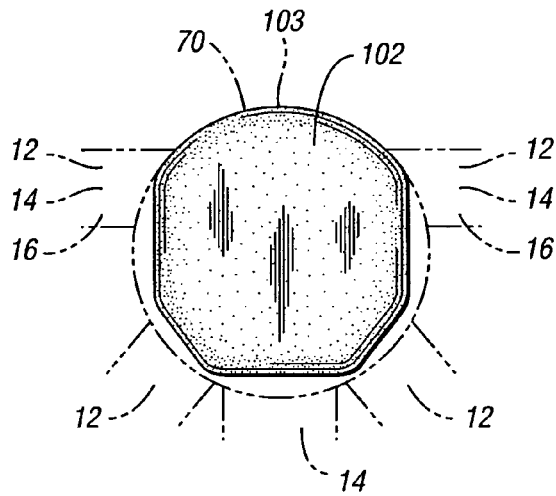
Figure 1I:
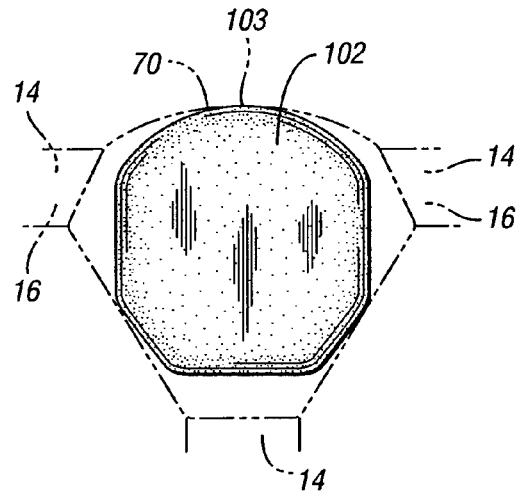
Figures 1, 3D:
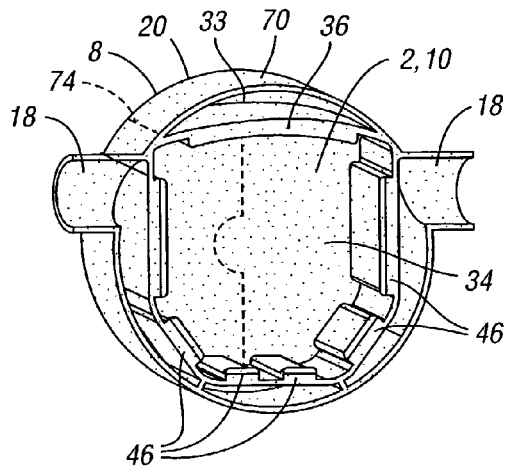
Figures 3, 3D:
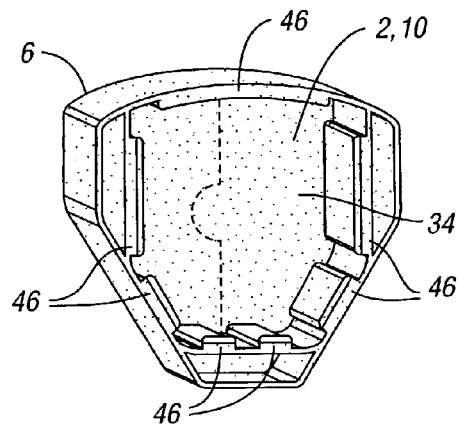
Figures 2, 3D:
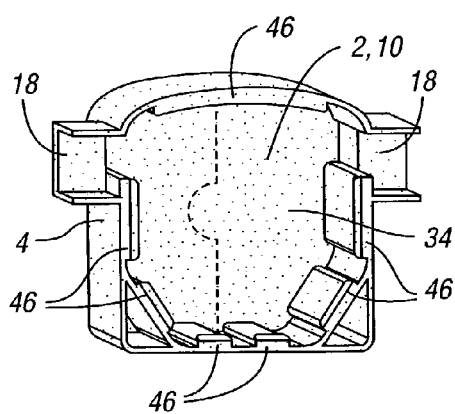
Figures 3, 3D, 4:
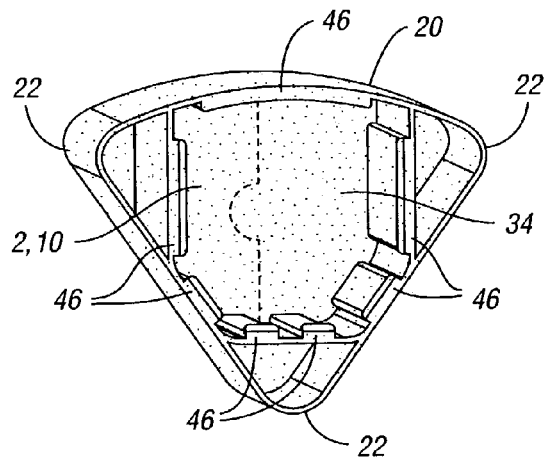
Figures 1, 4A:
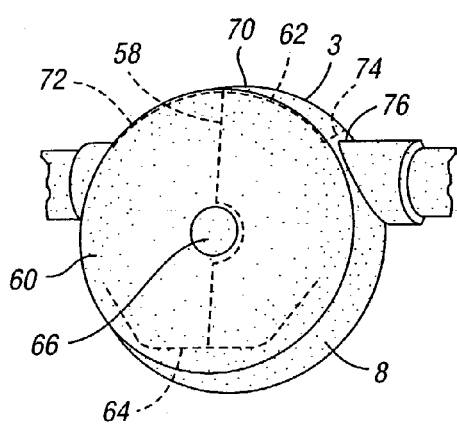
Figures 2, 4A:
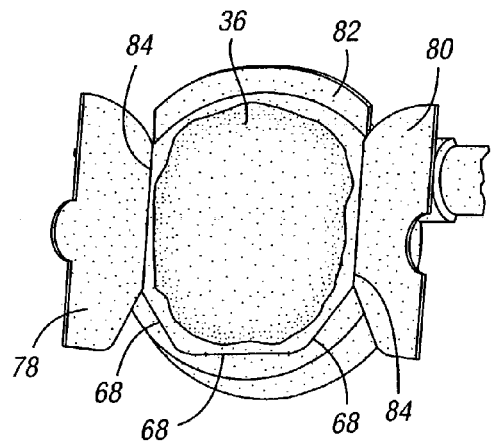
Figures 1, 4B:
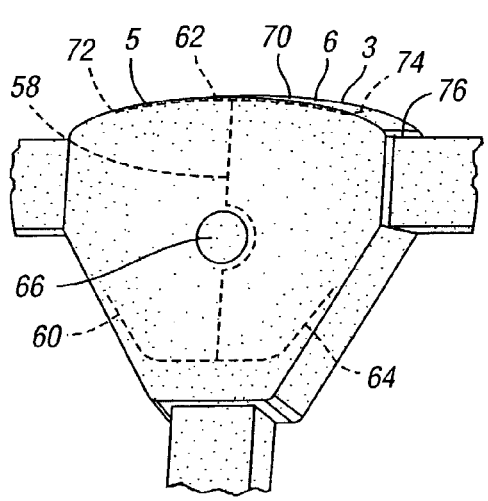
Figures 2, 4B:
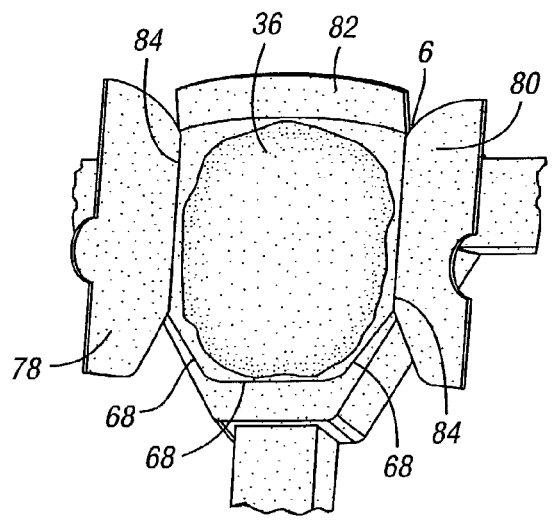
Figures 1, 4C:
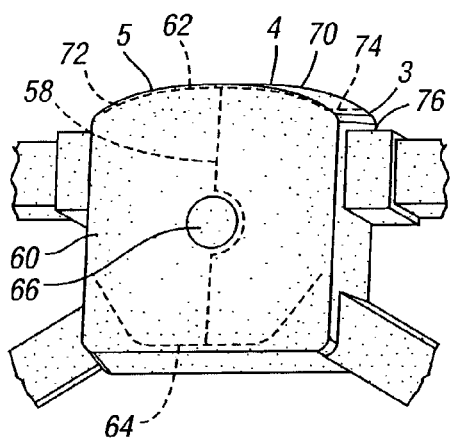
Figures 2, 4C:
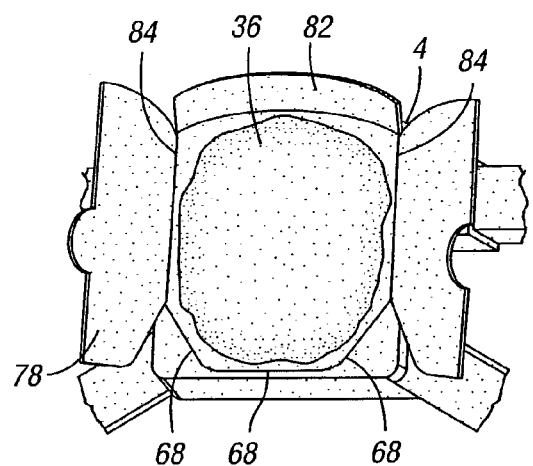

FIGS. 4A-1 through 4C-2 illustrate the "1" tear pattern with a separate upper escape path flap approach. The tear pattern approach is common for a round shaped cover 8, a rectangular shaped cover 4, and a triangular shaped cover 6. A vertical tear seam 58 is located on the under side of the cover face 60. The vertical tear seam 58 routes from an upper tear seam 62 to a lower tear seam 64. As an option, the vertical tear seam 58 may route around the side of an attached discrete emblem 66 on the covers 4, 6, 8, and 20 (FIGS. 3D–4). If the attached discrete emblem is in two pieces or has a weak seam running through it, it may also be possible to have the vertical tear seam 58 go through the emblem. The lower tear seam 64 is routed near the lower edge of the common internal housing walls 68 (FIGS. 4B-2, 4C-2 and 5A-2). The upper tear seam 62 routes near the upper edge of the cover formed between the cover face 60 and the cover upper surface 70. An optional left upper tear seam 72 and an optional right upper tear seam 74 route forward on the cover from the upper tear seam 62 toward the base plate 28 (see FIGS. 2A and C). The base plate 28 is on the back of the modules shown in FIGS. 5A-1 through 5C-2 and, accordingly, is unseen. The optional left and right upper tear seams 72, 74 may run all the way to the base plate 28 or stop short of the base plate 28. The left upper tear seam 72 and the right upper tear seam 74 may be located away from the steering wheel spokes as shown in FIGS. 4A1–C1. They may also be positioned at the locations 76 where the steering wheel spokes merge into the base shape of the air bag module covers 4, 6, 8, and 20. The tear seams 58, 62, 64, 72, 74 may be hidden or visible on the show or appearance surfaces of covers 4, 6, 8, and 20. To reduce the breakout pressure needed to open the cover, it is preferred that the covers 4, 6, 8, and 20 and tear seams 58, 62, 64, 72, and 74 be designed so that they are placed on the inside of the outer appearance surface walls of the covers. Upon deployment and with reference to FIGS. 4A-2 for example, the cushion 36 will push on the covers 4, 6, 8, and 20, the cover tear seams 58, 62, 64, 72, and 74 will open, and a left flap 78, a right flap 80, and an upper flap 82 will be produced. The left flap 78 and the right flap 80 will hinge near the side edges 84 of the common internal cover walls. The upper flap 82 will hinge near the cover attachment to the base plate 28.

The upper flap 82, which is optional, provides an escape path for the upper portion of the cushion 36 to deploy forward of the steering wheel rim when an out-of-position occupant is present and blocking the cushion deployment. This upper escape path results in reduced loading to an out-of-position occupant. If optional upper flap 82 was not used, the cover would then open producing a left flap 78 and a right flap 80.

This tear seam approach is best executed with the common cushion pack configuration or cross-section 2, as shown in FIGS. 1A–1E. The common cushion pack cross-section 2 is in close proximity to the cover upper surface 70 at locations 3 and 5. Thus the upper cover tear seams 72, 74 only need to tear through the outer layer of cover material during deployment.

Refer now to FIG. 3D-1. In order to maintain an internal cover cavity 34 which is sufficiently common for each cover shape to accommodate the common shape of the cushion pack subassembly 24, it may be necessary to add a wall 33 slightly below the cover upper surface 70 for the round cover shape 8. Alternatively, as shown in FIG. 3C for cover 9, ribs 11 or 35 may also be used. In either case, upper tear seam 62 would be located just below these features.

"I" Tear Pattern with Upper Escape Path Flaps Attached to Main Cover Flaps

Figures 1, 5A:
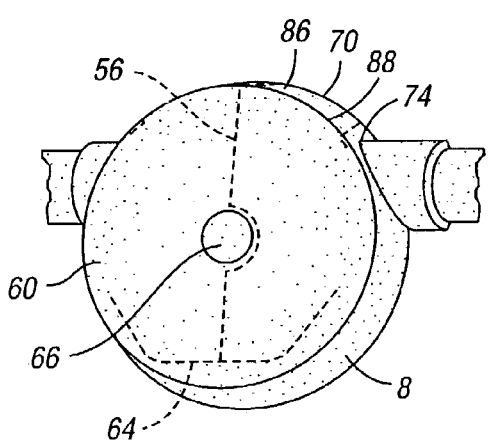
Figures 2, 5A:
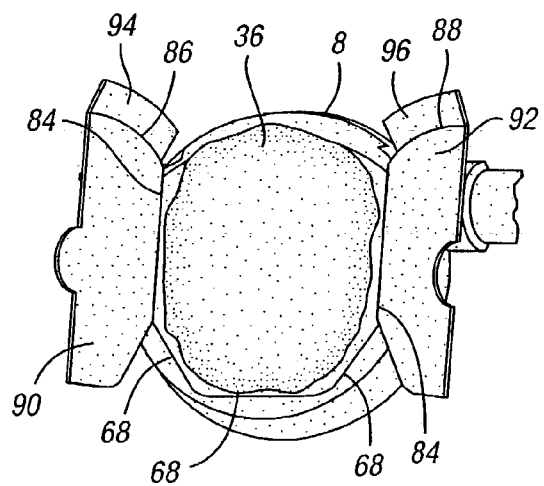
Figures 1, 5B:
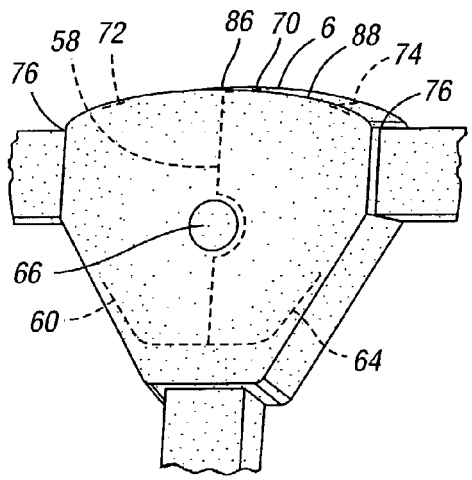
Figures 2, 5B:
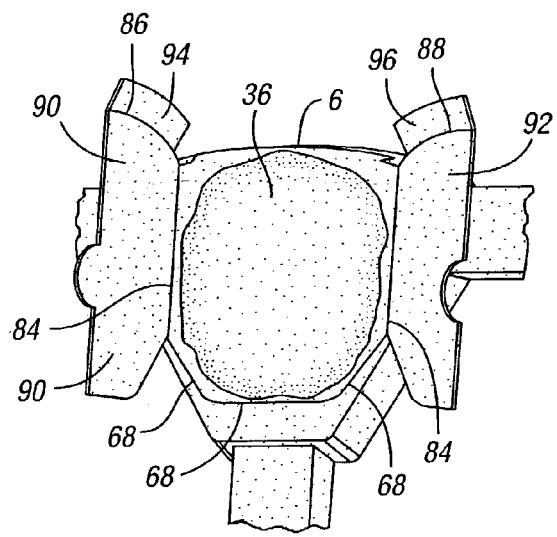

FIGS. 5A-1 through 5C-2 illustrate the "I" tear pattern with upper escape path flaps attached to the main cover flaps approach. The tear pattern approach is common for a round shaped cover 8 (FIG. 5A-1), a rectangular shaped cover 4 (FIG. 5C-1), and a triangular shaped cover 6 (FIG. 5B-1). A vertical tear seam 58 is located on the under side of each cover face 60. The vertical tear seam 58 routes from the base plate 28 or near the base plate 28 (FIG. 2C) on the forward edge of the upper cover surface 70 to a lower tear seam 64. As an option, the vertical tear seam 58 may route around the side of an attached discrete emblem 66 on the covers 4, 6, 8, and 20 (FIG. 2E-4). If the attached discrete emblem is in two pieces or has a weak seam running through it, it may also be possible to have the vertical tear seam 58 go through the emblem. The lower tear seam 64 is routed near the lower edge of the common internal housing walls 68.

Figures 1, 5C:
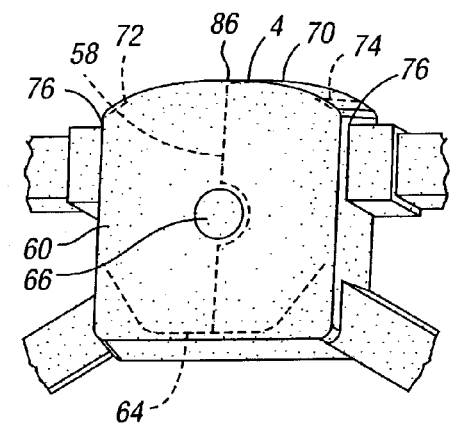
Figures 2, 5C:
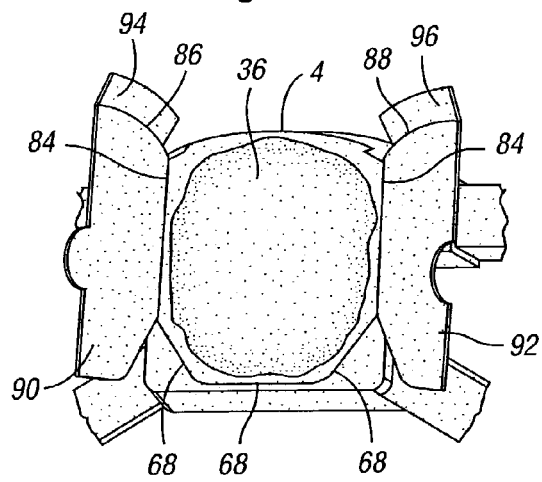

An optional upper left hinge 86 and right hinge 88 route near the upper edge of the cover formed between the cover face 60 and the cover upper surface 70. An optional left upper tear seam 72 and an optional right upper tear seam 74 route forward on the cover from the upper left and right hinges 86, 88 toward the base plate 28. The left upper tear seam 72 and the right upper tear seam 74 may be located away from the steering wheel spokes as shown in FIGS. 5A-1 through 5C-2. They may also be positioned at the locations 76 where the steering wheel spokes merge into the base shape of the air bag module covers 4, 6, 8, and 20. The tear seams 58, 64, 72, and 74 may be hidden or visible on the covers 4, 6, 8, and 20 show surface. To reduce the breakout pressure needed to open the covers, it is preferred that the covers 4, 6, 8, and 20 and tear seams 58, 64, 72, and 74 be designed so that they are placed on the inside of the outer show or appearance surface walls of the cover. Upon deployment, the cushion 36 will push on the covers 4, 6, 8, and 20, the cover tear seams 58, 64, 72, and 74 will open, and a left flap 90 and a right flap 92 will be produced (FIGS. 5A-2 through 5C-2). The left flap 90 and the right flap 92 will hinge near the side edges 84 of the common internal housing walls. The left upper flap 94 will remain attached to the left flap 90 and the right upper flap 96 will remain attached to the right flap 92. As seen in FIGS. 5B-2 and 5C-2 this tear seam arrangement results in a flap-on-flap.

Figure 5D:
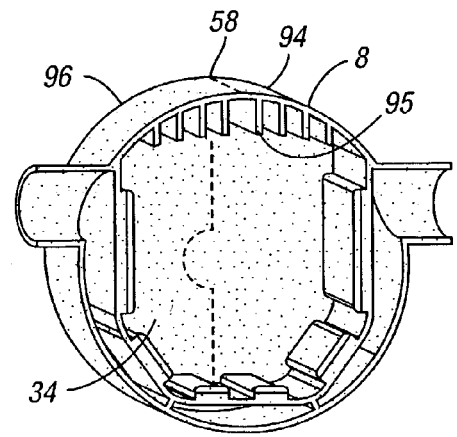
FIGS. 5D and 5E show perspective rear views of round covers with space bridging ribs and tear-channel forming walls, respectively.
Figure 5E:
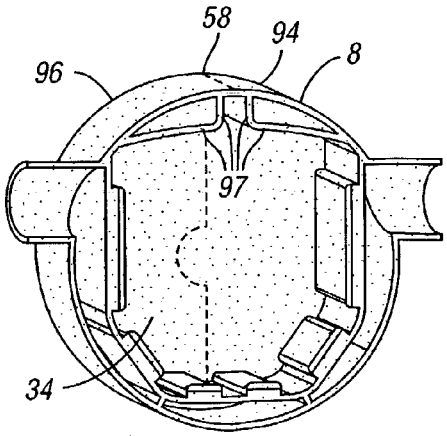

As illustrated in FIG. 5D, for the round cover 8, it may be necessary to place some ribbing 95 or other void filling material so that the cushion pack volume or configuration remains common and so that tear seam 58 only has one material layer to tear through. As illustrated in FIG. 5E, for the round cover 8, it is also possible to use internal walls 97 so that the cushion pack volume or configuration remains common and so that tear seam 58 only has one material layer to tear through.

Two left and right upper flaps 94, 96 attachment options are possible prior to deployment. The upper flaps 94, 96 may be unattached to the air bag module base plate 28, as shown with respect to left upper flap 94 in FIG. 6. In this view, the upper flaps would likely be routed under the steering wheel shroud 98. The other option is to attach the upper flaps 94, 96 to the air bag module base plate 28, such as is shown in FIG. 2C, where the outer attachment ring 42 seats inside the cover tabs 46. Each air bag supplier has multiple methods to attach the cover. Any of these methods could be used. In this case, a weakness or tear seam would be molded into the upper flaps 94, 96 near the attachment location 100 to the base plate so that the cover would tear at that location upon deployment, freeing the flaps. It is also possible that the weakness could consist of the cover tabs 46 being configured so that they pull out of their attachment to the baseplate 28 and outer attachment ring 42.

The left and right upper flaps 94, 96 provide an escape path for the upper portion of the cushion to deploy forward of the steering wheel rim.

Alternative "H" Tear Seam Configuration

Figures 1, 9A:
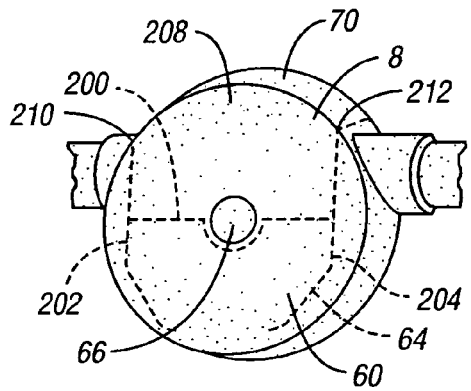
Figures 2, 9A:
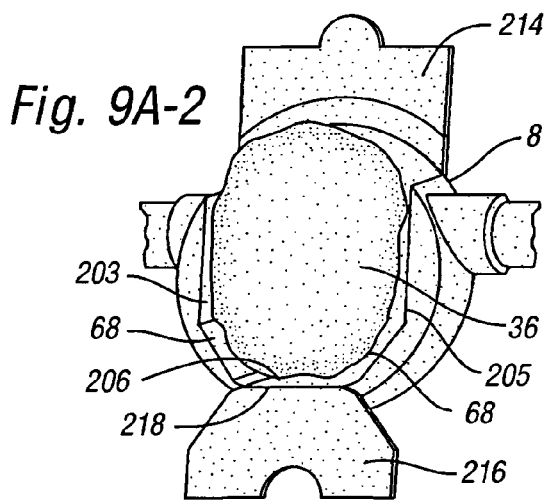
Figures 1, 9B:
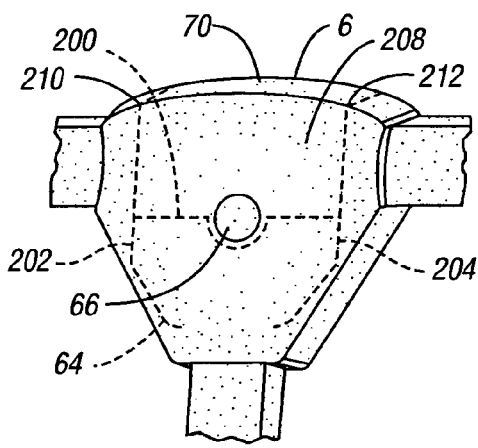
Figures 2, 9B:
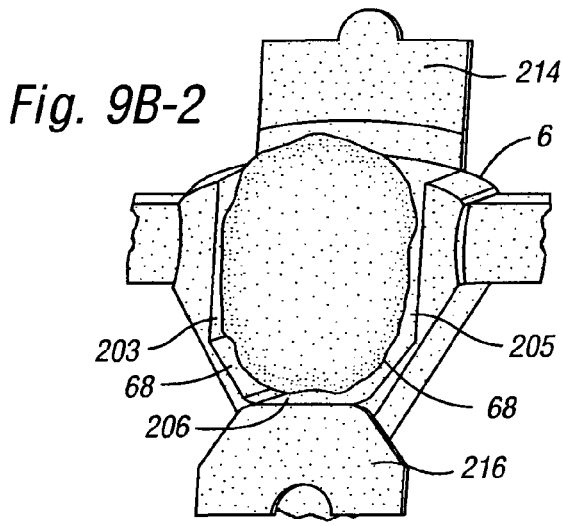
Figures 1, 9C:
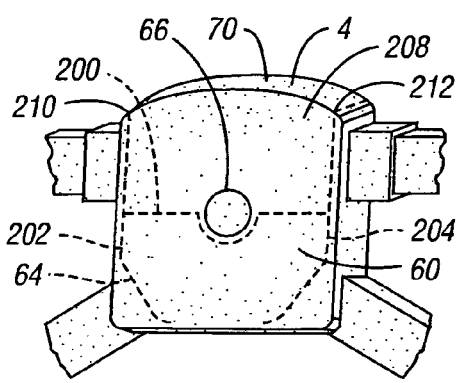
Figures 2, 9C:
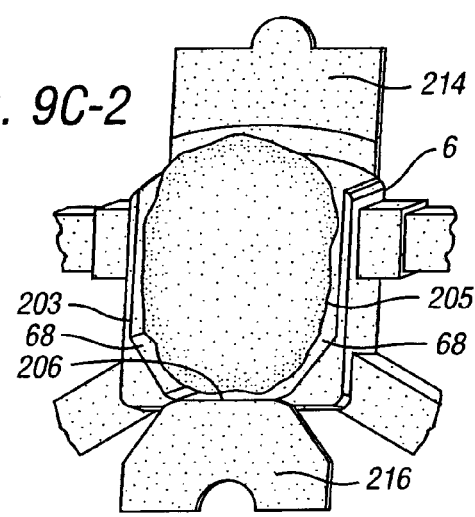
Figure 9D:
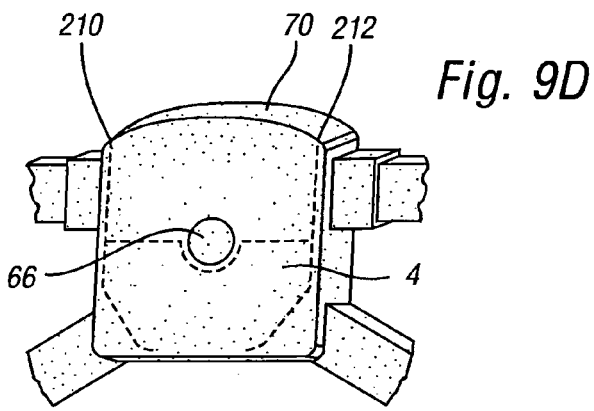
FIG. 9D shows a perspective front view (before tearing) of a rectangular steering wheel cover with a four-spoke wheel having an "H" tear pattern and tear seams terminating where the cover face meets the upper surface of the cover to form upper and lower escape path flaps.

FIGS. 9A-1 through 9D illustrate the "H" tear pattern approach. The tear pattern approach is common for a round shaped cover 8, a rectangular shaped cover 4, and a triangular shaped cover 6. A horizontal tear seam 200 is located on the cover face 60. The horizontal tear seam 200 terminates at two vertically oriented tear seams 202, 204 that route along the left and right perimeter of the common internal housing walls 203, 205 and terminate at the bottom edge 206 of the common internal housing walls. The vertical tear seams 202, 204 can either route around the top surface 70 of the cover and terminate at the base plate 28 or near the base plate 28 (FIG. 2C). In addition, the vertical tear seams 202, 204 may terminate at the point 210, 212 where the cover face 60 meets with the cover upper surface 70.

As an option, the horizontal tear seam 200 may route around the side of an attached discrete emblem 66 on the covers 4, 6, and 8. If the attached discrete emblem is in two pieces or has a weak seam running through it, it may also be possible to have the horizontal tear seam 200 go through the emblem. The horizontal tear seam 200 may pass above or below the discrete emblem 66. The lower tear seam 64 is routed near the lower edge of the common internal housing walls 68.

The tear seams 200, 202, 204 may be hidden or visible on the cover 4, 6, and 8 as a show or appearance surface. To reduce the breakout pressure needed to open the cover, it is preferred that the covers 4, 6, and 8 and tear seams 200, 202, and 204 be designed so that they are placed on the inside of the outer show or appearance surface walls of the cover. Upon deployment, the cushion 36 will push on the covers 4, 6, and 8, the cover tear seams 200, 202, and 204 will open, and an upper flap 214 and a lower flap 216 will extend and be produced. The lower flap 216 will hinge near the bottom side edge 206 of the common internal housing walls. The upper flap 214 will hinge near the base plate 28 or near the edge where the cover face 208 meets with the cover upper surface 70.

As illustrated in FIG. 5D, for the round cover 8, it may be necessary to place some ribbing 95 or other void filling material so that the cushion pack volume remains common. As illustrated in FIG. 5E, for the round cover 8, it is also possible to use internal walls 97 so that the cushion pack volume remains common. It is also possible to use one common wall that bridges walls 97 in FIG. 5E because an "H" tear seam does not include tear seam 58.

Cover Internals with the Alternative Common Cushion Pack Cross-Section or Configuration As illustrated in FIGS. 1F–I and 7A–F, it is possible to use the alternative common cushion pack cross-section 102 that is in close proximity to the upper cover surface 70 at locations 103. For round cover shape 8, the alternative common cushion pack cross-section 102 would be in close proximity with the inside of cover surface 70 along the entire upper surface. For rectangular cover shape 4 and triangular cover shape 6, there would either be walls 110 (FIGS. 7B and C), ribs 112 (FIGS. 7E and F), or a combination of both to create a rounded upper perimeter for the alternative common cushion pack cross-section or configuration 102. The walls 110 or ribs 112 would be positioned so that there would be only one layer of cover material at locations 114, 116, 118 where the upper cover tear seams or hinges are located.

Figure 6:
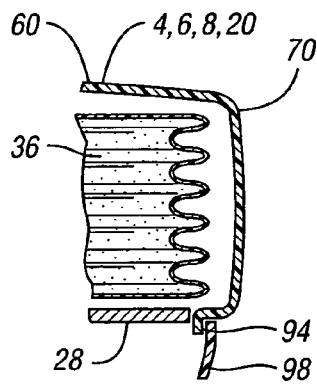
FIG. 6 is a fragmentary cross-section of an air bag cover, cushion pack subassembly and steering wheel shroud.

The previously described "I" tear pattern with separate upper escape path flap, the "I" tear pattern with upper escape path flaps attached to the main cover flaps, or the "H" tear pattern may be used. For some of these tear seam configurations, tabs 120 may be used to attach the cover to the module base plate 28 and the outer attachment ring 42. With alternative common cushion pack cross-section 102, it is also possible to route a portion of the cover under the steering wheel shroud 98, as illustrated in FIG. 6.

Alternative Lower Cover Tear Seam Configurations

"T" Tear Seam.

Any of the above concepts involving an "I" tear seam may also use a lower cover tear seam configuration that produces a lower flap such as 122, 124, 126, 128, and 130, as illustrated in FIGS. 8A-1 through 8E-2. If an attached discrete emblem 66 is used, it would likely be attached to a lower flap such as 122, 124, 126, 128, and 130. Alternatively, it could be attached to the side flaps such as 132, 134, 136, 138, 140, 144, 146, 148, and 150. If a multiple piece discrete emblem is used, portions of the emblem may be attached to a lower flap such as 122, 124, 126, 128, and 130 and a side flap such as 132, 134, 136, 138, 140, 142, 144, 146, 148, and 150. These tear seam configurations are compatible with all other cushion pack and cover concepts contained in this description.

Figures 1, 14A:
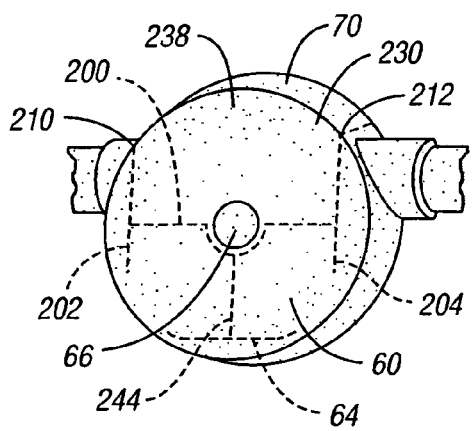
Figures 2, 14A:
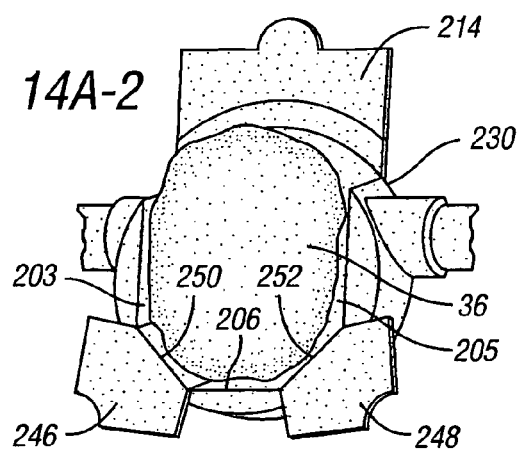
Figures 1, 14B:
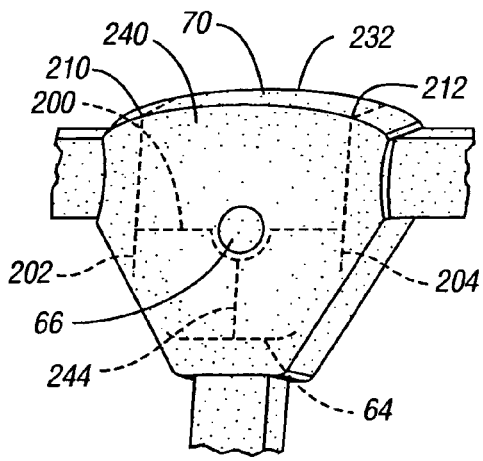
Figures 2, 14B:
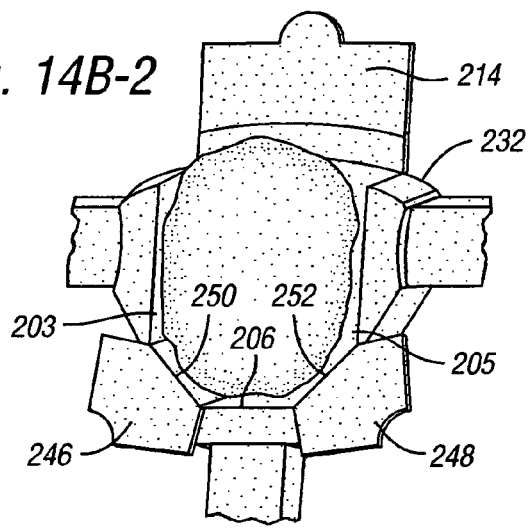
Figures 1, 14C:
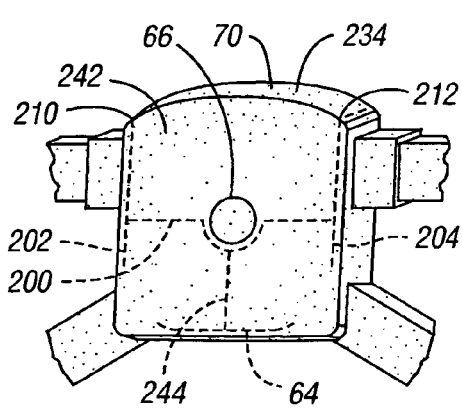
Figures 2, 14C:
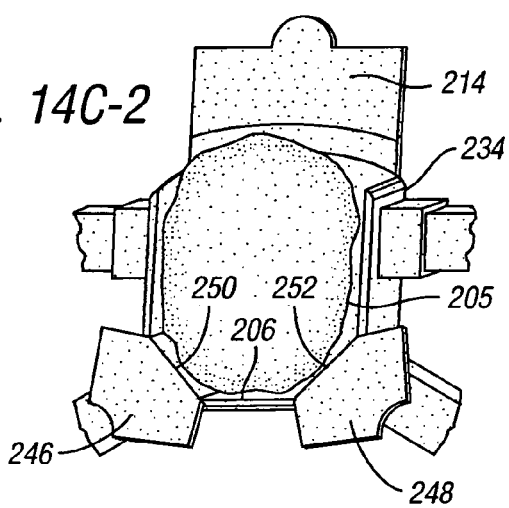

"T" Tear Seam:

With reference to FIGS. 14A, B and C, a "T" tear seam may also use a lower cover tear seam configuration that produces a pair of lower flaps.

FIGS. 14A-1 through 14C-2 illustrate the "T" tear pattern approach. The tear pattern approach is common for a round shaped cover 230, a rectangular shaped cover 234, and a triangular shaped cover 232. A horizontal tear seam 200 is located on the cover face 238 (round), 240 (triangular), and 242 (rectangular). The horizontal tear seam 200 terminates at two vertically oriented tear seams 202, 204 that route along the left and right perimeter of the common internal housing walls 203, 205 and terminate at the bottom edge 206 of the common internal housing walls. The vertical tear seams 202, 204 can route around the top surface 70 of the cover and terminate at the base plate 28 or near the base plate 28 (FIGS. 14A-1 through 14C-2). In addition, the vertical tear seams 202, 204 may terminate at the point 210, 212 where the cover face 238, 240 and 242 meets with the cover upper surface 70. In addition to the horizontal tear seams 200, the "T" is formed by a vertical tear seam 244.

As an option, the horizontal tear seam 200 may route around the side of an attached discrete emblem 66 on the covers 230, 232, and 234. If the attached discrete emblem is in two pieces or has a weak seam running through it, it may also be possible to have the horizontal tear seam 200 go through the emblem. The horizontal tear seam 200 may pass above or below the discrete emblem 66. The lower tear seam 64 is routed near the lower edge 206 of the common internal housing walls 203.

The tear seams 200, 202, 204 and 244 may be hidden or visible on the cover 230, 232 and 234 as a show or appearance surface. To reduce the breakout pressure needed to open the cover, it is preferred that the covers 230, 232 and 234 and tear seams 200, 202, 204 and 244 be designed so that they are placed on the inside of the outer show or appearance surface walls of the cover. Upon deployment, the cushion 36 will push on the covers 230, 232 and 234, the cover tear seams 200, 202, 204 and 244 will open, and an upper flap 214 and lower flaps 246 and 248 will extend and be produced. The lower flaps will hinge near the angled side edges 250, 252 of the common internal housing walls. The upper flap 214 will hinge near the base plate 28 or near the edge where the cover faces 238, 240 and 242 meet with the cover upper surface 70.

Air Bag Cover Recess Below the Steering Wheel Show Surface

As illustrated in FIGS. 1 and 7, when placed in a steering wheel 29, the driver air bag module cover face 60 is recessed below the steering wheel rim show or appearance surface 104, preferably about 10 mm. As a further aid to steering wheel commonality, a common steering wheel depth 106 of about 135 mm is preferred.

Optional Lower Tear Seams on Cover Sides

FIGS. 10A–D show a round cover with an "I" tear pattern and FIGS. 11A–D show a round cover with an "H" tear pattern. As illustrated in FIGS. 10A–D and FIGS. 11A–D, the cover 8 can have optional lower tear seams 120, 122 on the cover sides. These tear seams may need to route slightly on the cover face to reach their connection location on the cover tear seams. These tear seams allow the lower portion of the cover 8 to tear and hinge at the module base plate 28 instead of at the cover face. The cushion 36 may then expand slightly in a radial direction before exiting the cover.

Figure 10A:
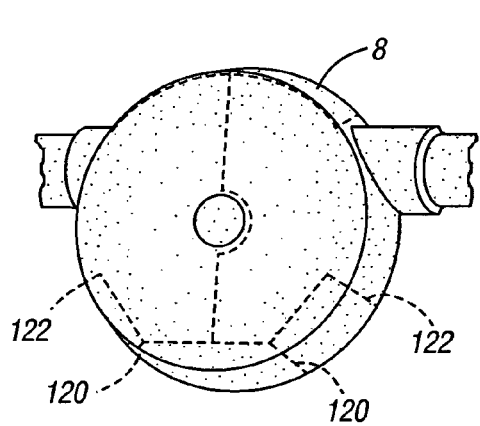
FIG. 10A shows a perspective view (before tearing) of a round cover for a two-spoke steering wheel having an "I" tear pattern with tear seams extending onto the side of the cover.
Figure 10B:
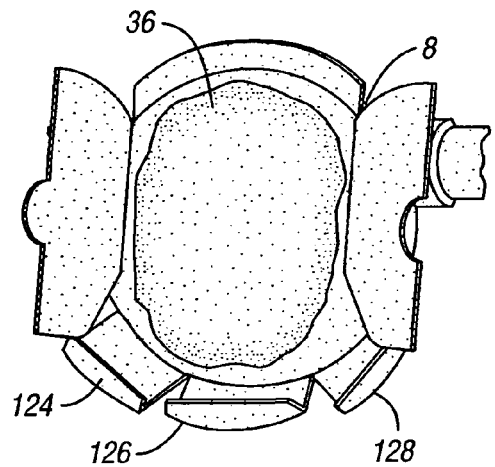
FIGS. 10B, 10C and 10D show perspective views (after tearing) of optional lower tear seams on the cover side of the round steering wheel cover of FIG. 10A to form right and left flaps and various lower escape path flaps.
Figure 10C:
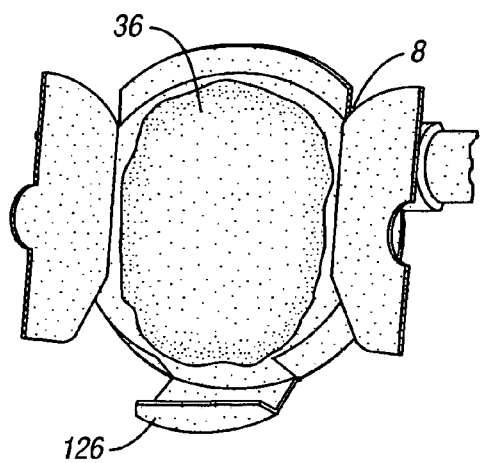
Figure 10D:
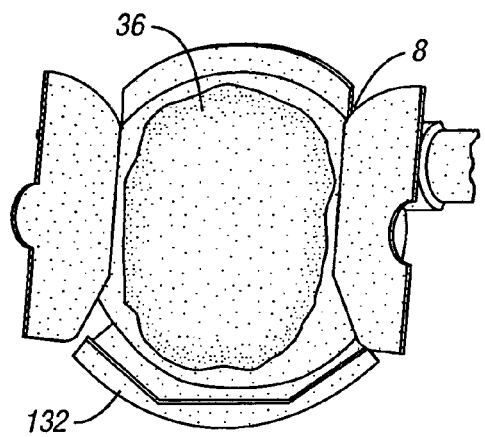
Figure 11A:
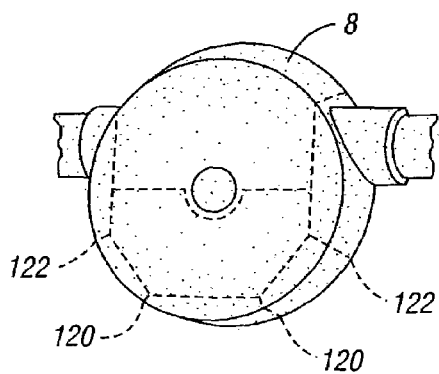
FIG. 11A shows a perspective front view (before tearing) of a round steering wheel cover for a two-spoke steering wheel having an "H" tear pattern with tear seams extending onto the side of the cover.
Figure 11B:
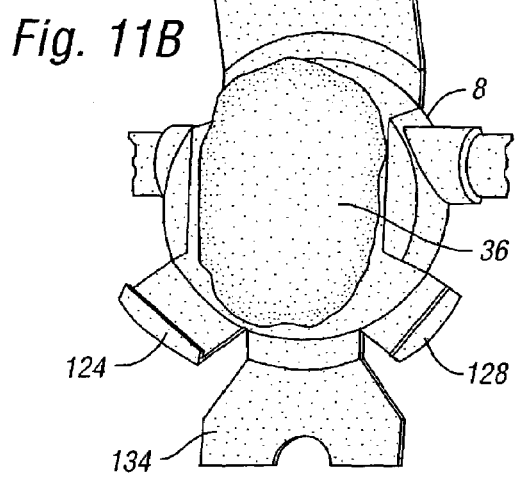
FIGS. 11B, 11C and 11D show perspective front views (after tearing) of optional lower tear seams and upper and lower escape path flaps on the cover sides of the round steering wheel cover of FIG. 11A.
Figure 11C:
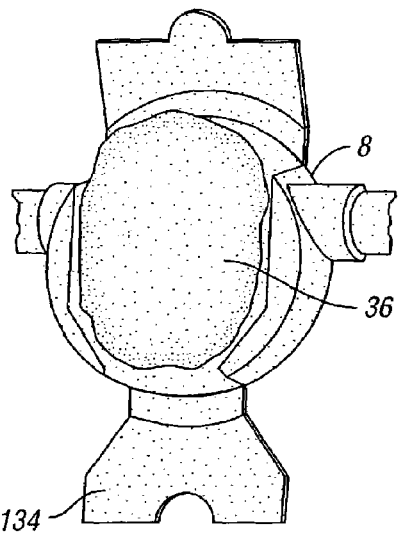
Figure 11D:
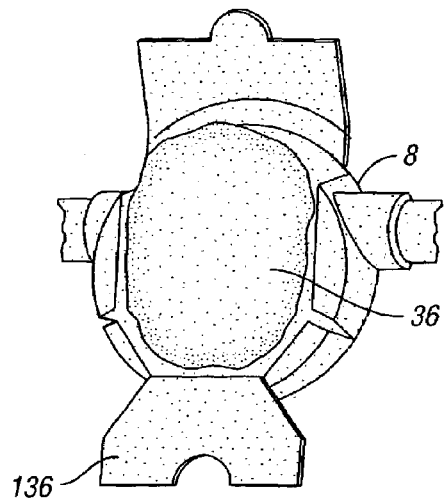

If all lower tear seams 120, 122 are used, then the cover can break into lower flaps 124, 128, and either 126 or 134 (FIGS. 10B and 11B). If only lower tear seams 120 are used, then the cover can break into lower flaps 126 and 134 (FIGS. 10C and 11C). If only lower tear seams 122 are used, then the cover can break into flaps 132 and 136 (FIGS. 10D and 11D).

Figure 12:
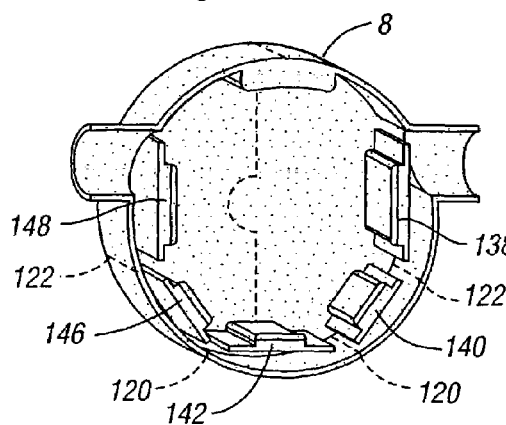
FIG. 12 shows a perspective rear view of a round steering wheel cover cavity for a two-spoke steering wheel having tear seams routed between internal escape path flaps.
Figure 13:
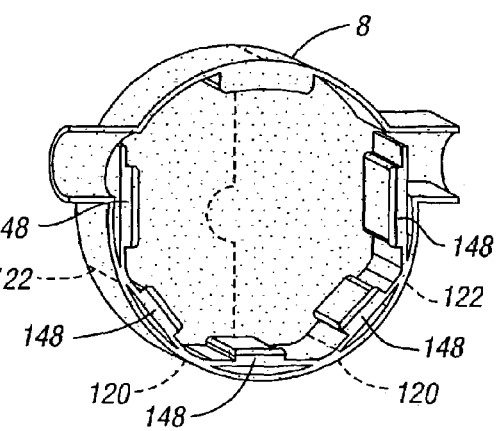
FIG. 13 shows a perspective rear view of a round steering wheel cover for a two-spoke steering wheel having tear seams routed along the outer cover surface at the point where the internal escape path flaps contact the outer cover surface.

The lower tear seams 120, 122 may route in between flaps 138, 140, 142, 144, 146, and 148 as illustrated in FIG. 12. This enables the tear seams to only be on one material thickness, that being the outer cover surface. Alternatively, as illustrated in FIG. 13, the lower tear seams 120, 122 may route to the point where the internal flaps 148 only contact the outer cover surface. This also enables the tear seams to only be on one material thickness thick.

These lower tear seams on the cover sides can be applied to almost any cover shape and any steering wheel spoke orientation. These lower tear seams on the cover sides can also be applied to other module face cover tear seam orientations other than the "I" tear pattern shown in FIGS. 12 and 13.

Other Options

There may be further variations within the concepts of this invention, to wit:

A single level inflator or a dual (multiple) level inflator may be used.

A mechanism that releases or extends the cushion tethers may also be included.

A mechanism that opens or shuts a vent either in the cushion or the housing may be included.

A mechanism that releases or extends the cushion tethers and opens or shuts a vent in either the cushion or housing may be included.

Some covers may have attached discrete emblems and some covers may not have attached discrete emblems. The emblems can be in various shapes.

While the best modes for carrying out the present invention have been described in detail, those familiar with the art to which this invention relates will recognize various alternative methods for carrying out the invention within the scope of the appended claims.

What is claimed is:

1. In combination with any selected one of a plurality of vehicle steering wheel covers having respectively differently configured outer peripheral walls at least one of which is a rounded peripheral wall, said outer peripheral walls defining one of a substantially round cover shape, a substantially rectangular cover shape, a substantially triangular cover shape and a combination of said shapes and partially defining respectively differently configured cavities, a cushion pack subassembly having a predetermined common peripheral configuration fittable within each of the different cavities and being differently spatially related to at least one of the outer peripheral walls defining the cavity but contiguous to the rounded peripheral wall in the selected one of the plurality of vehicle steering wheel covers, whereby to form a driver air bag module.

2. The driver air bag module of claim 1, wherein each of the plurality of vehicle steering wheel covers has a flappable cover face, said cover face further defining said respective cavity and having a cover tear seam, said cover tear seam defining at least three sides of a flap in said cover face, said cover tear seam being common to the cover tear seam on each of the others of the plurality of vehicle steering wheel covers.

3. The driver air bag module of claim 2, wherein the cover tear seam on the flappable cover face is configured so that, upon deployment of the cushion pack, the cover face opens into a plurality of flaps at least one of which is configured to provide a secondary escape path in the cover which permits the cushion pack to deploy laterally.

4. The driver air bag module of claim 2, wherein the cover tear seam is configured as an H.

5. The driver air bag module of claim 4, wherein the cover tear seam consists of a horizontal tear seam on the cover face that continues from a left tear seam to a right tear seam, wherein the left and right tear seams follow internal cover walls, route around lower chamfered internal cover walls and terminate at a bottom internal cover wall so that, upon deployment, the cover is permitted to open into an upper flap and a lower flap.

6. The driver air bag module of claim 4, including a cover face and wherein others of the peripheral walls defining the cavity are internal chamfered and bottom cover walls wherein the cover tear seam consists of a horizontal tear seam on the cover face that continues from a left tear seam to a rigid tear seam, the left and right tear seams then following the internal cover walls to continue upward around an upper cover surface to an edge of the cover to angle around the lower chamfered internal cover walls and terminate at the bottom internal cover wall so that upon deployment, the cover is permitted to open into an upper flap and a lower flap.

7. The driver air bag module of claim 2, wherein the cover tear seam is configured as a T.

8. The driver air bag module of claim 7, wherein others of the peripheral walls defining the cavity are vertical and bottom internal cover walls, and wherein the cover tear seam consists of a horizontal tear seam on the cover face that continues from a left tear seam to a right tear seam, the left and right tear seams then following the vertical internal cover walls and a vertical tear seam that routes from the center of the horizontal tear seam to a horizontal tear seam at the bottom internal cover wall so that upon deployment, the cover is permitted to open into an upper flap and a lower left flap and a lower right flap.

9. The driver air bag module of claim 7, including a cover face and wherein others of the peripheral walls defining the cavity are vertical and bottom internal cover walls, and wherein the cover tear seam consists of a horizontal tear seam on the cover face that continues from a left tear seam to a right tear seam, the left and right tear seams following the vertical internal cover housing walls and continuing upward around an upper cover surface to an edge of the upper cover surface and a vertical cover tear seam that routes from the center of the horizontal tear seam to a horizontal tear seam at the bottom internal cover wall so that upon deployment, the cover is permitted to open into an upper flap and a lower left flap and a lower right flap.

10. The driver air bag module of claim 2, wherein the cover tear seam is configured as an I.

11. The driver air bag module of claim 10 including a base plate, wherein the cover tear seam consists of a vertical tear seam on the cover face that continues around an upper surface of the cover to a location near an edge of the cover, a lower tear seam on the cover face where the vertical tear seam terminates which follows inner cover lower and chamfered walls and without the edge of the cover being attached to the base plate and, upon deployment, permits the cover to open into a left flap and a right flap.

12. The driver air bag module of claim 10 including a base plate, wherein the cover tear seam consists of a vertical tear seam on the cover face that continues around an upper cover surface of the cover to an edge of the cover, a lower tear seam on die cover face where the vertical tear seam terminates which follows inner cover lower horizontal and chamfered walls and with the edge of the upper cover surface being separably attached to the base plate and, upon deployment, permits the cover to open into a left flap and a right flap when the separable attachment between the edge of the upper cover surface and the base plate separates.

13. The driver air bag module of claim 2, wherein the cover rear seam routes around an emblem mounted to the cover face.

14. The driver air bag module of claim 1, including a predetermined base plate common to the predetermined peripheral configuration of the cushion pack subassembly.

15. The driver air bag module of claim 1, wherein the cushion pack subassembly includes a predetermined common cushion pack at least partially defining the predetermined peripheral configuration being contiguous to the rounded peripheral wall when said cushion pack subassembly is fit within said common cavity of the selected one of the plurality of covers.

16. The driver air bag module of claim 15, including ribs as a portion of the peripheral walls forming a barrier that defines the predetermined peripheral configuration.

17. The driver air bag module of claim 15, including internal walls within the outer peripheral walls as a baffler that defines the predetermined peripheral configuration.

18. The driver air bag module of claim 15, wherein said outer peripheral walls are used to form a barrier that defines predetermined peripheral configuration.

19. The driver air bag module of claim 15, wherein the outer peripheral walls defining the cavity include a barrier that at least partially defines the predetermined peripheral configuration by structural configurations taken from the group including ribs, internal walls, and one of said outer peripheral walls for the selected one of the plurality of vehicle steering wheel covers that is placed over the common cushion pack portion.

20. The driver air bag module of claim 1, wherein each of the plurality of vehicle steering wheel covers has a flappable upper cover surface at least partially defining the cavity on the selected one of the plurality of vehicle steering wheel covers, and the upper cover surface has a tear seam so that upon deployment the cover is permitted to open into a left side attached to the left side flap and an upper right flap attached to the right side flap.

21. A method of manufacturing a common air bag cushion pack subassembly for use in each of a plurality of interchangeable vehicle steering wheel covers having respectively differently configured outer peripheral walls including a rounded peripheral wall, said outer peripheral walls defining one of a substantially round cover shape, a substantially rectangular cover shape, a substantially triangular cover shape and a combination of said shapes, said covers defining respectively differently configured cavities for receiving the air bag cushion pack subassembly to form an air bag module, the method comprising;

configuring a cushion pack subassembly which is sufficiently fittable within each of the differently configured cavities such that the subassembly will be receivable therein, and which subassembly has a peripheral wall which is spaceable differently from the steering wheel cover outer peripheral walls at respective points along the peripheral wall of the subassembly and contiguous with the rounded wall when the subassembly is received in the cavity of the steering wheel cover;

configuring a base plate with a peripheral configuration substantially like the peripheral wall configuration of the cushion pack subassembly; and sandwiching an inflator between the base plate and the cushion pack subassembly.

22. In combination with any selected one of a plurality of steering wheels having spoke-formed steering wheel spaces and vehicle steering wheel covers having respectively differently configured spoke-accommodating outer peripheral walls at least one of which is a rounded peripheral wall, said outer peripheral walls defining one of a substantially round cover shape, a substantially rectangular cover shape, a substantially triangular cover shape and a combination of said shapes and partially defining respectively differently configured cavities, a cushion pack subassembly having a cushion pack and a predetermined common peripheral configuration fittable within each of the different cavities and being differently spatially related to at least one of the outer peripheral walls defining the cavity but contiguous to the rounded peripheral wall in the vehicle steering wheel cover of the selected one of the plurality of steering wheels, whereby to form a driver air bag module; and wherein each of the vehicle steering wheel covers has a flappable cover face, said cover face further defining said respective cavity and having a cover rear seam, said cover tear seam defining at least three sides of a flap in said cover face, said cover tear seam being common to the cover tear seams on each of the others of the vehicle steering wheel covers; and wherein the cover tear seam on the flappable cover face is configured so that, upon deployment of the cushion pack, the cover face opens into a plurality of flaps at least one of which is configured to provide a secondary escape path in the cover which permits the cushion pack to deploy laterally into at least one of the steering wheel spaces.

23. In combination with any selected one of a plurality of vehicle steering wheel covers having respectively differently configured outer peripheral walls at least one of which is a rounded peripheral wall, said outer peripheral walls defining one of a substantially round cover shape, a substantially rectangular cover shape, a substantially triangular cover shape and a combination of said shapes and partially defining respectively differently configured cavities, a cushion pack subassembly having a predetermined common peripheral configuration friable within each of the different cavities and being differently spatially related to at least one of the outer peripheral walk defining the cavity but contiguous to the rounded peripheral wall iii the selected one of the plurality of vehicle steering wheel covers, and a base plate, whereby to form a driver air bag module;

wherein each of the plurality of vehicle steering wheel covers has a flappable cover face, said cover face further defining said respective cavity and having a cover tear seam, said cover tear seam defining at least three sides of a flap in said cover face, said cover tear seam being common to the cover tear seam on each of the others of the plurality of vehicle steering wheel covers;

wherein the cover rear seam is configured as an I;

wherein the cover tear seam consists of a vertical tear seam on the cover face that terminates at an upper tear seam running approximately between the cover face and an upper cover surface and including two tear seams that initiate at the bottom of the vertical tear seam and route outward to internal cover walls and terminate substantially at two primarily angled tear seams near the internal cover walls and including left and right secondary tear seams that run from the upper tear seam along the upper cover surface toward the base plate so tat, upon deployment, the cover opens into a left flap, a right flap and an upper flap.

24. In combination with, any selected one of a plurality of vehicle steering wheel covers having respectively differently configured outer peripheral walls at least one of which is a rounded peripheral wall, said outer peripheral walls defining one of a substantially round cover shape, a substantially rectangular cover shape, a substantially triangular cover shape and a combination of said shapes and partially defining respectively differently configured cavities, a cushion pack subassembly having a predetermined common peripheral configuration fittable within each of the different cavities and being differently spatially related to at least one of the outer peripheral walls defining the cavity but contiguous to the rounded peripheral wall in the selected one of the plurality of vehicle steering wheel coven, whereby to form a driver air bag module;

said cushion pack subassembly comprising an inflator, a base plate and a cushion pack, said cushion pack subassembly being configured in elevation as a substantial square with two chamfered corners on one side and a substantially coextensively rounded side opposite the side with the chamfered corners, said rounded side being contiguous wit said rounded peripheral wall.

* * * * *